US012461228B1

(12) United States Patent
Kramer

(10) Patent No.: US 12,461,228 B1
(45) Date of Patent: Nov. 4, 2025

(54) RADAR-INERTIAL ODOMETRY FOR AUTONOMOUS GROUND VEHICLES

(71) Applicant: Amazon Technologies, Inc., Seattle, WA (US)

(72) Inventor: Andrew J. Kramer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 394 days.

(21) Appl. No.: 17/898,061

(22) Filed: Aug. 29, 2022

(51) Int. Cl.
*G01S 13/88* (2006.01)
*B60W 60/00* (2020.01)
*G01S 13/86* (2006.01)

(52) U.S. Cl.
CPC ........... *G01S 13/88* (2013.01); *B60W 60/001* (2020.02); *G01S 13/867* (2013.01); *B60W 2420/408* (2024.01); *B60W 2554/20* (2020.02); *B60W 2554/40* (2020.02)

(58) Field of Classification Search
None
See application file for complete search history.

(56) References Cited

U.S. PATENT DOCUMENTS

| | | | |
|---|---|---|---|
| 4,865,248 | A | 9/1989 | Barth |
| 4,954,962 | A | 9/1990 | Evans, Jr. et al. |
| 5,040,116 | A | 8/1991 | Evans, Jr. et al. |
| 5,301,114 | A | 4/1994 | Mitchell |
| 5,386,462 | A | 1/1995 | Schlamp |
| 5,995,898 | A | 11/1999 | Tuttle |
| 6,344,796 | B1 | 2/2002 | Ogilvie et al. |
| 6,426,699 | B1 | 7/2002 | Porter |
| 6,504,530 | B1 | 1/2003 | Wilson et al. |
| 6,690,997 | B2 | 2/2004 | Rivalto |
| 6,694,217 | B2 | 2/2004 | Bloom |

(Continued)

FOREIGN PATENT DOCUMENTS

| | | |
|---|---|---|
| EP | 2228779 A2 | 9/2010 |
| WO | 2015134376 A1 | 9/2015 |

OTHER PUBLICATIONS

Arandjelovic, R. et al. "NetVLAD: CNN Architecture for Weakly Supervised Place Recognition." Proceedings of the IEEE Conference on Computer Vision and Pattern Recognition. 2016, 17 pages.

(Continued)

*Primary Examiner* — Whitney Moore
(74) *Attorney, Agent, or Firm* — Athorus, PLLC

(57) ABSTRACT

Autonomous ground vehicles that are outfitted with radar sensors and inertial measurement units accurately determine states of the autonomous ground vehicles, e.g., estimates of the vehicles' positions, orientations, or velocities or accelerations along or about one or more axes, based on data captured by the radar sensors and the inertial measurement units. Where objects are detected in radar scans, the objects are determined to be static (or fixed), or dynamic (or moving), and landmarks representing static objects are identified. Constraints on estimates of states may be calculated based on doppler effects, inertial measurement unit effects, or locations of landmarks, and the states may be determined as solutions to optimization problems based on the data and the calculated constraints. Odometry messages representing the determined states may be generated and stored or utilized for any purpose.

20 Claims, 13 Drawing Sheets

(56) References Cited

U.S. PATENT DOCUMENTS

| | | | |
|---|---|---|---|
| 6,919,803 B2 | 7/2005 | Breed |
| 6,961,711 B1 | 11/2005 | Chee |
| 6,970,838 B1 | 11/2005 | Kamath et al. |
| 7,129,817 B2 | 10/2006 | Yamagishi |
| 7,133,743 B2 | 11/2006 | Tilles et al. |
| 7,188,513 B2 | 3/2007 | Wilson |
| 7,337,686 B2 | 3/2008 | Sagi-Dolev |
| 7,337,944 B2 | 3/2008 | Devar |
| 7,339,993 B1 | 3/2008 | Brooks et al. |
| 7,409,291 B2 | 8/2008 | Pasolini et al. |
| 8,321,128 B2 | 11/2012 | Park |
| 8,532,862 B2 | 9/2013 | Neff |
| 8,571,743 B1 | 10/2013 | Cullinane |
| 8,688,306 B1 | 4/2014 | Nemec et al. |
| 8,738,213 B1 | 5/2014 | Szybalski et al. |
| 8,855,847 B2 | 10/2014 | Uehara |
| 9,079,587 B1 | 7/2015 | Rupp et al. |
| 9,120,484 B1 | 9/2015 | Ferguson et al. |
| 9,147,296 B2 | 9/2015 | Ricci |
| 9,201,421 B1 | 12/2015 | Fairfield et al. |
| 9,294,474 B1 | 3/2016 | Alikhani |
| 9,381,916 B1 | 7/2016 | Zhu et al. |
| 9,440,647 B1 | 9/2016 | Sucan et al. |
| 9,558,664 B1 | 1/2017 | Gaebler et al. |
| 9,718,564 B1 | 8/2017 | Beckman et al. |
| 11,353,578 B2 * | 6/2022 | Wang ..................... G01S 13/42 |
| 2001/0045449 A1 | 11/2001 | Shannon |
| 2002/0016726 A1 | 2/2002 | Ross |
| 2002/0087375 A1 | 7/2002 | Griffin et al. |
| 2002/0111914 A1 | 8/2002 | Terada et al. |
| 2002/0116289 A1 | 8/2002 | Yang |
| 2002/0123930 A1 | 9/2002 | Boyd et al. |
| 2003/0040980 A1 | 2/2003 | Nakajima et al. |
| 2003/0097047 A1 | 5/2003 | Woltermann et al. |
| 2003/0141411 A1 | 7/2003 | Pandya et al. |
| 2003/0162523 A1 | 8/2003 | Kapolka et al. |
| 2004/0172167 A1 | 9/2004 | Pasolini et al. |
| 2006/0136237 A1 | 6/2006 | Spiegel et al. |
| 2006/0178140 A1 | 8/2006 | Smith et al. |
| 2007/0005609 A1 | 1/2007 | Breed |
| 2007/0016496 A1 | 1/2007 | Bar et al. |
| 2007/0073552 A1 | 3/2007 | Hileman |
| 2007/0150375 A1 | 6/2007 | Yang |
| 2007/0170237 A1 | 7/2007 | Neff |
| 2007/0244614 A1 | 10/2007 | Nathanson |
| 2007/0293978 A1 | 12/2007 | Wurman et al. |
| 2008/0059068 A1 | 3/2008 | Strelow et al. |
| 2008/0150679 A1 | 6/2008 | Bloomfield |
| 2008/0154659 A1 | 6/2008 | Bettes et al. |
| 2008/0161986 A1 | 7/2008 | Breed |
| 2008/0167817 A1 | 7/2008 | Hessler et al. |
| 2008/0301009 A1 | 12/2008 | Plaster et al. |
| 2009/0005985 A1 | 1/2009 | Basnayake |
| 2009/0062974 A1 | 3/2009 | Tamamoto et al. |
| 2009/0063166 A1 | 3/2009 | Palmer |
| 2009/0106124 A1 | 4/2009 | Yang |
| 2009/0149985 A1 | 6/2009 | Chirnomas |
| 2009/0236470 A1 | 9/2009 | Goossen et al. |
| 2009/0247186 A1 | 10/2009 | Ji et al. |
| 2009/0299903 A1 | 12/2009 | Hung et al. |
| 2009/0314883 A1 | 12/2009 | Arlton et al. |
| 2010/0012573 A1 | 1/2010 | Dendel et al. |
| 2010/0057360 A1 | 3/2010 | Ohkubo |
| 2010/0121573 A1 | 5/2010 | Imafuku et al. |
| 2010/0125403 A1 | 5/2010 | Clark et al. |
| 2010/0157061 A1 | 6/2010 | Katsman et al. |
| 2010/0241355 A1 | 9/2010 | Park |
| 2010/0250134 A1 | 9/2010 | Bornstein et al. |
| 2010/0312461 A1 | 12/2010 | Haynie et al. |
| 2011/0035149 A1 | 2/2011 | McAndrew et al. |
| 2011/0066377 A1 | 3/2011 | Takaoka |
| 2011/0071759 A1 | 3/2011 | Pande et al. |
| 2011/0112764 A1 | 5/2011 | Trum |
| 2011/0125403 A1 | 5/2011 | Smith |
| 2011/0208496 A1 | 8/2011 | Bando et al. |
| 2011/0264311 A1 | 10/2011 | Lee et al. |
| 2012/0039694 A1 | 2/2012 | Suzanne |
| 2012/0083960 A1 | 4/2012 | Zhu et al. |
| 2012/0109419 A1 | 5/2012 | Mercado |
| 2012/0219397 A1 | 8/2012 | Baker |
| 2013/0073477 A1 | 3/2013 | Grinberg |
| 2013/0081245 A1 | 4/2013 | Vavrina et al. |
| 2013/0148123 A1 | 6/2013 | Hayashi |
| 2013/0214925 A1 | 8/2013 | Weiss |
| 2013/0218799 A1 | 8/2013 | Lehmann et al. |
| 2013/0231824 A1 | 9/2013 | Wilson et al. |
| 2013/0238170 A1 | 9/2013 | Klinger |
| 2013/0261792 A1 | 10/2013 | Gupta et al. |
| 2013/0262251 A1 | 10/2013 | Wan et al. |
| 2013/0262252 A1 | 10/2013 | Lakshman et al. |
| 2013/0262276 A1 | 10/2013 | Wan et al. |
| 2013/0262336 A1 | 10/2013 | Wan et al. |
| 2013/0264381 A1 | 10/2013 | Kim et al. |
| 2013/0297099 A1 | 11/2013 | Rovik |
| 2014/0022055 A1 | 1/2014 | Levien et al. |
| 2014/0030444 A1 | 1/2014 | Swaminathan et al. |
| 2014/0032034 A1 | 1/2014 | Raptopoulos et al. |
| 2014/0052661 A1 | 2/2014 | Shakes et al. |
| 2014/0081507 A1 | 3/2014 | Urmson et al. |
| 2014/0095009 A1 | 4/2014 | Oshima et al. |
| 2014/0136282 A1 | 5/2014 | Fedele |
| 2014/0136414 A1 | 5/2014 | Abhyanker |
| 2014/0156133 A1 | 6/2014 | Cullinane et al. |
| 2014/0172290 A1 | 6/2014 | Prokhorov et al. |
| 2014/0188376 A1 | 7/2014 | Gordon |
| 2014/0200737 A1 | 7/2014 | Lortz et al. |
| 2014/0244678 A1 | 8/2014 | Zamer et al. |
| 2014/0254896 A1 | 9/2014 | Zhou et al. |
| 2014/0278052 A1 | 9/2014 | Slavin et al. |
| 2015/0006005 A1 | 1/2015 | Yu et al. |
| 2015/0069968 A1 | 3/2015 | Pounds |
| 2015/0102154 A1 | 4/2015 | Duncan et al. |
| 2015/0120602 A1 | 4/2015 | Huffman et al. |
| 2015/0129716 A1 | 5/2015 | Yoffe |
| 2015/0153175 A1 | 6/2015 | Skaaksrud |
| 2015/0153735 A1 | 6/2015 | Clarke et al. |
| 2015/0158599 A1 | 6/2015 | Sisko |
| 2015/0175276 A1 | 6/2015 | Koster |
| 2015/0183528 A1 | 7/2015 | Walsh et al. |
| 2015/0185034 A1 | 7/2015 | Abhyanker |
| 2015/0193005 A1 | 7/2015 | Censo et al. |
| 2015/0227882 A1 | 8/2015 | Bhatt |
| 2015/0241878 A1 | 8/2015 | Crombez et al. |
| 2015/0246727 A1 | 9/2015 | Masticola et al. |
| 2015/0259078 A1 | 9/2015 | Filipovic et al. |
| 2015/0268665 A1 | 9/2015 | Ludwick et al. |
| 2015/0291032 A1 | 10/2015 | Kim et al. |
| 2015/0317597 A1 | 11/2015 | Shucker et al. |
| 2015/0332206 A1 | 11/2015 | Trew et al. |
| 2015/0345966 A1 | 12/2015 | Meuleau |
| 2015/0345971 A1 | 12/2015 | Meuleau et al. |
| 2015/0346727 A1 | 12/2015 | Ramanujam |
| 2015/0348112 A1 | 12/2015 | Ramanujam |
| 2015/0348335 A1 | 12/2015 | Ramanujam |
| 2015/0363986 A1 | 12/2015 | Hoyos et al. |
| 2015/0367850 A1 | 12/2015 | Clarke et al. |
| 2015/0370251 A1 | 12/2015 | Siegel et al. |
| 2016/0009413 A1 | 1/2016 | Lee et al. |
| 2016/0025973 A1 | 1/2016 | Guttag et al. |
| 2016/0033966 A1 | 2/2016 | Farris et al. |
| 2016/0068156 A1 | 3/2016 | Horii |
| 2016/0085565 A1 | 3/2016 | Arcese et al. |
| 2016/0093212 A1 | 3/2016 | Barfield et al. |
| 2016/0104099 A1 | 4/2016 | Villamar |
| 2016/0114488 A1 | 4/2016 | Medina et al. |
| 2016/0144734 A1 | 5/2016 | Wang et al. |
| 2016/0144959 A1 | 5/2016 | Meffert |
| 2016/0144982 A1 | 5/2016 | Sugumaran |
| 2016/0207627 A1 | 7/2016 | Hoareau et al. |
| 2016/0209220 A1 | 7/2016 | Laetz |
| 2016/0209845 A1 | 7/2016 | Kojo et al. |
| 2016/0216711 A1 | 7/2016 | Srivastava et al. |
| 2016/0247404 A1 | 8/2016 | Srivastava et al. |
| 2016/0257401 A1 | 9/2016 | Buchmueller et al. |

(56) References Cited

U.S. PATENT DOCUMENTS

| | | | |
|---|---|---|---|
| 2016/0266578 | A1 | 9/2016 | Douglas et al. |
| 2016/0288796 | A1 | 10/2016 | Yuan |
| 2016/0299233 | A1 | 10/2016 | Levien et al. |
| 2016/0300400 | A1 | 10/2016 | Namikawa |
| 2016/0301698 | A1 | 10/2016 | Katara et al. |
| 2016/0307449 | A1 | 10/2016 | Gordon et al. |
| 2016/0334229 | A1 | 11/2016 | Ross et al. |
| 2016/0364989 | A1 | 12/2016 | Speasl et al. |
| 2016/0370193 | A1 | 12/2016 | Maischberger et al. |
| 2017/0010613 | A1 | 1/2017 | Fukumoto |
| 2017/0032315 | A1 | 2/2017 | Gupta et al. |
| 2017/0096222 | A1 | 4/2017 | Spinelli et al. |
| 2017/0098378 | A1 | 4/2017 | Soundararajan et al. |
| 2017/0101017 | A1 | 4/2017 | Streett |
| 2017/0123421 | A1* | 5/2017 | Kentley ............... G05D 1/0011 |
| 2017/0164319 | A1 | 6/2017 | Skaaksrud et al. |
| 2017/0167881 | A1 | 6/2017 | Rander et al. |
| 2017/0301232 | A1 | 10/2017 | Xu et al. |
| 2018/0134286 | A1 | 5/2018 | Yi et al. |
| 2018/0307223 | A1 | 10/2018 | Peeters et al. |
| 2019/0042859 | A1 | 2/2019 | Schubert et al. |
| 2020/0249698 | A1 | 8/2020 | Lu et al. |
| 2021/0209785 | A1* | 7/2021 | Unnikrishnan ........... G01S 7/41 |

OTHER PUBLICATIONS

Barnes, Dan, and Ingmar Posner. "Under the Radar: Learning to Predict Robust Keypoints for Odometry Estimation and Metric Localisation in Radar." 2020 IEEE International Conference on Robotics and Automation (ICRA). IEEE, 2020. URL: https://arxiv.org/pdf/2001.10789.pdf, 7 pages.

Cen, Sarah H., and Paul Newman. "Precise Ego-Motion Estimation with Millimeter-Wave Radar Under Diverse and Challenging Conditions." 2018 IEEE International Conference on Robotics and Automation (ICRA). IEEE, 2018. URL: https://ori.ox.ac.uk/media/5535/2018icra_cen.pdf, 8 pages.

DHL Trend Research, "Self-Driving Vehicles in Logistics," Dec. 2014, Markus Kuckelhaus et al. (downloaded from http://www.dhl.com/content/dam/downloads/g0/about_us/logistics_insights/dhl_self_driving_vehicles.pdf with an archived Web version available on https://web.archive.org/web/20151018154844/http://www.dhl.com/content/dam/downloads/g0/about_us/logistics_insights/dhl_self_driving_vehicles.pdf), 39 pages.

DHL Trend Research, "Unmanned Aerial Vehicles in Logistics: a DHL perspective on implications and use cases for the logistics industry," 2014, Markus Kückelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.

Go, Yeong-Ju and Jong-Soo Choi. "An Acoustic Source Localization Method Using a Drone-Mounted Phased Microphone Array." Drones 5.3 (2021): 75, 18 pages, URL: https://www.mdpi.com/2504-446X/5/3/75.

Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.

Mike Murphy, "Google wants to deliver packages from self-driving trucks," published Feb. 9, 2016, URL: https://qz.com/613277/google-wants-to-deliver-packages-from-self-driving-trucks/, 4 pages.

Sandoval, "Google patents secure rolling box to receive packages from drones," Geekwire.com, Jan. 27, 2016, URL: http://www.geekwire.com/2016/google-pondering-drone-delivery-even-about-boxes-it-flies-to-front-doors/, 11 pages.

URL: https://web.archive.org/web/20160804001046/https://www.starship.xyz/, download date: Aug. 4, 2016, 21 pages.

Wang, Lin and Andrea Cavallaro. "Acoustic Sensing from a Multi-Rotor Drone." IEEE Sensors Journal 18.11 (2018): 4570-4582, URL: https://www.researchgate.net/publication/324468964_Acoustic_Sensing_From_a_Multi-Rotor_Drone.

Yoon, David J., et al. "Unsupervised Learning of Lidar Features for Use in a Probabilistic Trajectory Estimator." IEEE Robotics and Automation Letters 6.2 (2021): 2130-2138. URL: https://arxiv.org/pdf/2102.11261.pdf.

* cited by examiner

RADAR-INERTIAL ODOMETRY FOR AUTONOMOUS GROUND VEHICLES

BACKGROUND

Autonomous ground vehicles, which are sometimes called unmanned ground vehicles or autonomous mobile robots, are being increasingly utilized in the performance of a number of commercial applications, personal tasks, and other functions. For example, autonomous ground vehicles have been utilized to complete deliveries of food products or other items to locations or personnel indoors or outdoors, to survey ground conditions, to monitor traffic, or to identify situations requiring alternative or additional assistance from humans or other machines.

Autonomous ground vehicles are often programmed or configured to autonomously navigate from one location to another location under their own power. Many autonomous ground vehicles are outfitted with components for detecting any objects within a vicinity of an autonomous ground vehicle, or for determining information regarding a vehicle's position, orientation, velocity or acceleration along or about one or more axes. For example, some autonomous ground vehicles may be outfitted with one or more radar sensors that are configured to emit pulses of electromagnetic waves of radiation, and to capture reflections of the waves from objects. Additionally, some autonomous ground vehicles may be outfitted with an inertial measurement unit including gyroscopes, accelerometers, magnetometers, or other sensors configured to detect changes in linear or rotational motion.

Many sensors that may be utilized in connection with the operation of an autonomous ground vehicle have inherent limitations, inaccuracies or inefficiencies associated with their use, including radar sensors, inertial measurement units, and others.

Where an autonomous ground vehicle operates in narrow or confined spaces, or within proximity to obstacles or hazards such as humans or other animals, other vehicles, or stationary or moving objects, accurate determinations of positions, orientations, velocities or accelerations are essential to the safe operation of an autonomous ground vehicle.

DETAILED DESCRIPTION

As is set forth in greater detail below, the present disclosure is directed to the use of radar data and inertial data in odometry for autonomous ground vehicles. More specifically, one or more of the systems and methods disclosed herein are directed to determining a state of an autonomous ground vehicle based on synchronized radar scans captured by the autonomous ground vehicle, and inertial measurement unit data captured by the autonomous ground vehicle. Constraints on (or factors associated with) the positions, orientations, velocities or accelerations of the autonomous ground vehicle may be calculated from aspects of the radar scans and the inertial measurement unit readings, as well as aspects of static objects (e.g., landmarks) identified from the radar scans, which may be distinguished from dynamic objects. A state of an autonomous ground vehicle, e.g., estimates of position, orientation, linear velocity and angular velocity, or other attributes of the autonomous ground vehicle, may be determined at specific times and utilized for any purpose.

Figure 1A:
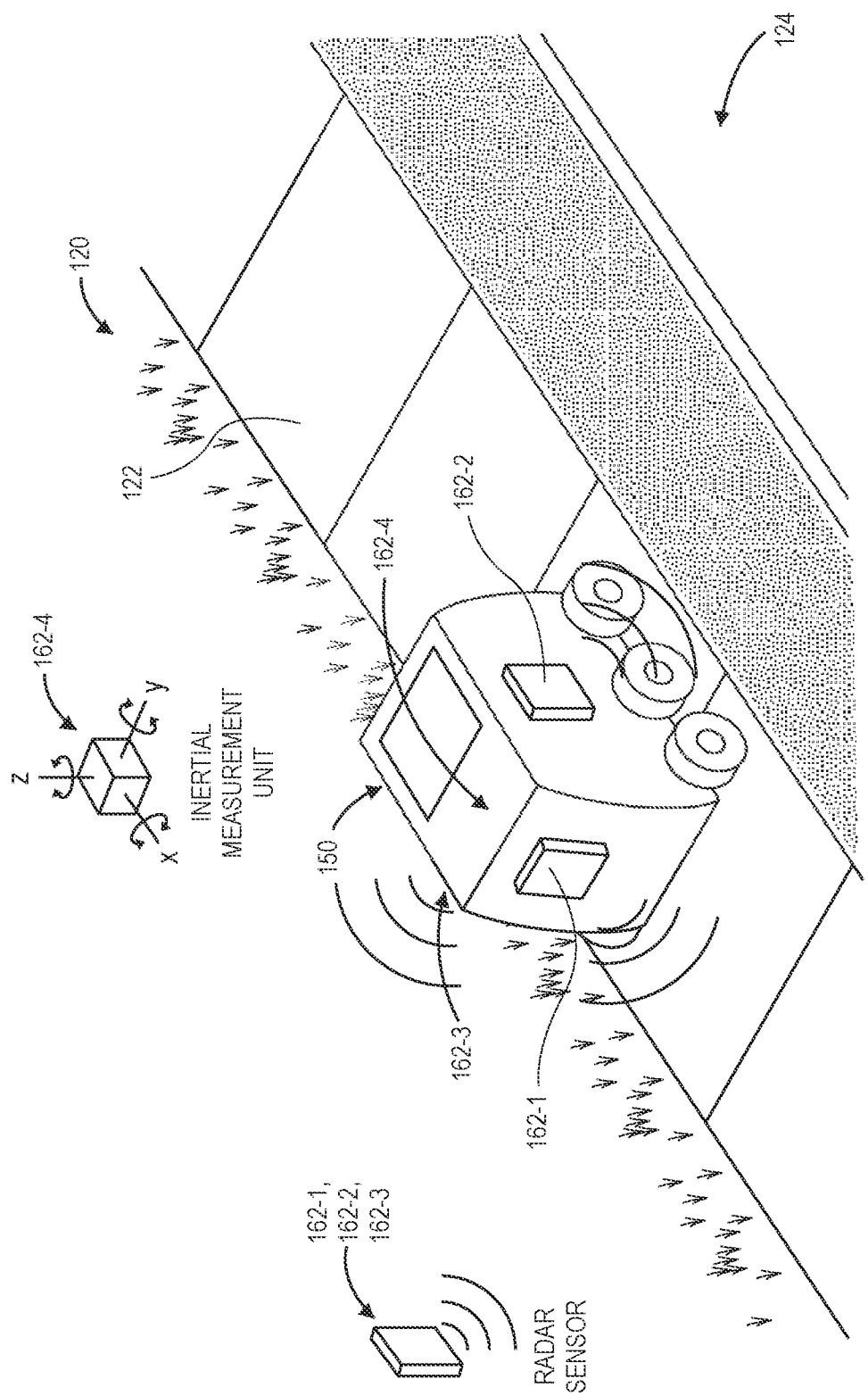
FIGS. 1A through 1H are views of aspects of one system for radar-inertial odometry in accordance with implementations of the present disclosure.

Referring to FIGS. 1A through 1H, views of aspects of one system for radar-inertial odometry in accordance with implementations of the present disclosure are shown. As is shown in FIG. 1A, an autonomous ground vehicle 150 is outfitted with a plurality of radar sensors 162-1, 162-2, 162-3, as well as an inertial measurement unit 162-4. The autonomous ground vehicle 150 is located within an area 120 (or region or space), which may be a portion of a community, a neighborhood, a village, a town, a city or any other developed or undeveloped space. The autonomous ground vehicle 150 is located on one of a plurality of sidewalks 122 adjacent one of a plurality of roads (or streets) 124 within the area 120.

The autonomous ground vehicle 150 may include any number of wheels mounted to axles that may be rotated by one or more motors, with dimensions, masses or other indicators of size that may be selected on any basis. The autonomous ground vehicle 150 may be sized and configured to travel on roads, sidewalks, crosswalks, bicycle paths, trails or the like, as well as yards, parking lots, driveways, patios or other surfaces, at various times or during various levels of congestion, and at various speeds, e.g., in response to one or more computer-based instructions.

When the autonomous ground vehicle 150 is engaged in ground operations, the radar sensors 162-1, 162-2, 162-3 may transmit electromagnetic waves of energy (e.g., radar scans) and capture returns of the electromagnetic waves reflected from objects. As is shown in FIG. 1A, the radar sensor 162-1 is aligned to transmit energy forward of the autonomous ground vehicle 150, and receive reflections of energy transmitted thereby. The radar sensor 162-2 is aligned to transmit energy from a port side (or a left side) of the autonomous ground vehicle 150, and receive reflections of energy transmitted thereby, while the radar sensor 162-3 is aligned to transmit energy from a starboard side (or a right side) of the autonomous ground vehicle 150, and receive reflections of energy transmitted thereby. Alternatively, the radar sensors 162-1, 162-2, 162-3 may be aligned to transmit energy in any direction or from any side of the autonomous ground vehicle 150, and receive reflections of energy transmitted thereby.

In some implementations, one or more of the radar sensors 162-1, 162-2, 162-3 may be millimeter wave radar sensors, e.g., radar sensors that transmit radar signals having wavelengths of one to ten millimeters (1-10 mm), or frequencies of approximately thirty to three hundred gigahertz (30-300 GHz). For example, in some implementations, one or more of the radar sensors 162-1, 162-2, 162-3 may emit signals having frequencies of approximately seventy-six to eighty-one gigahertz (76-81 GHZ), and wavelengths of approximately four millimeters.

Alternatively, or additionally, the autonomous ground vehicle 150 may further include any number of other sensors, including but not limited to other radar sensors, or any other type or form of sensors, such as imaging devices (e.g., cameras) configured to capture color, grayscale or black-and-white images, or any other images (e.g., depth images). Moreover, in some implementations, the radar sensors 162-1, 162-2, 162-3 or any other sensors may be aligned in any other orientation or configuration in accordance with the present disclosure.

The inertial measurement unit 162-4 may include one or more gyroscopes, accelerometers, compasses or other components, and generate data regarding motion of the autonomous ground vehicle 150 along or about one or more axes.

Figure 1B:
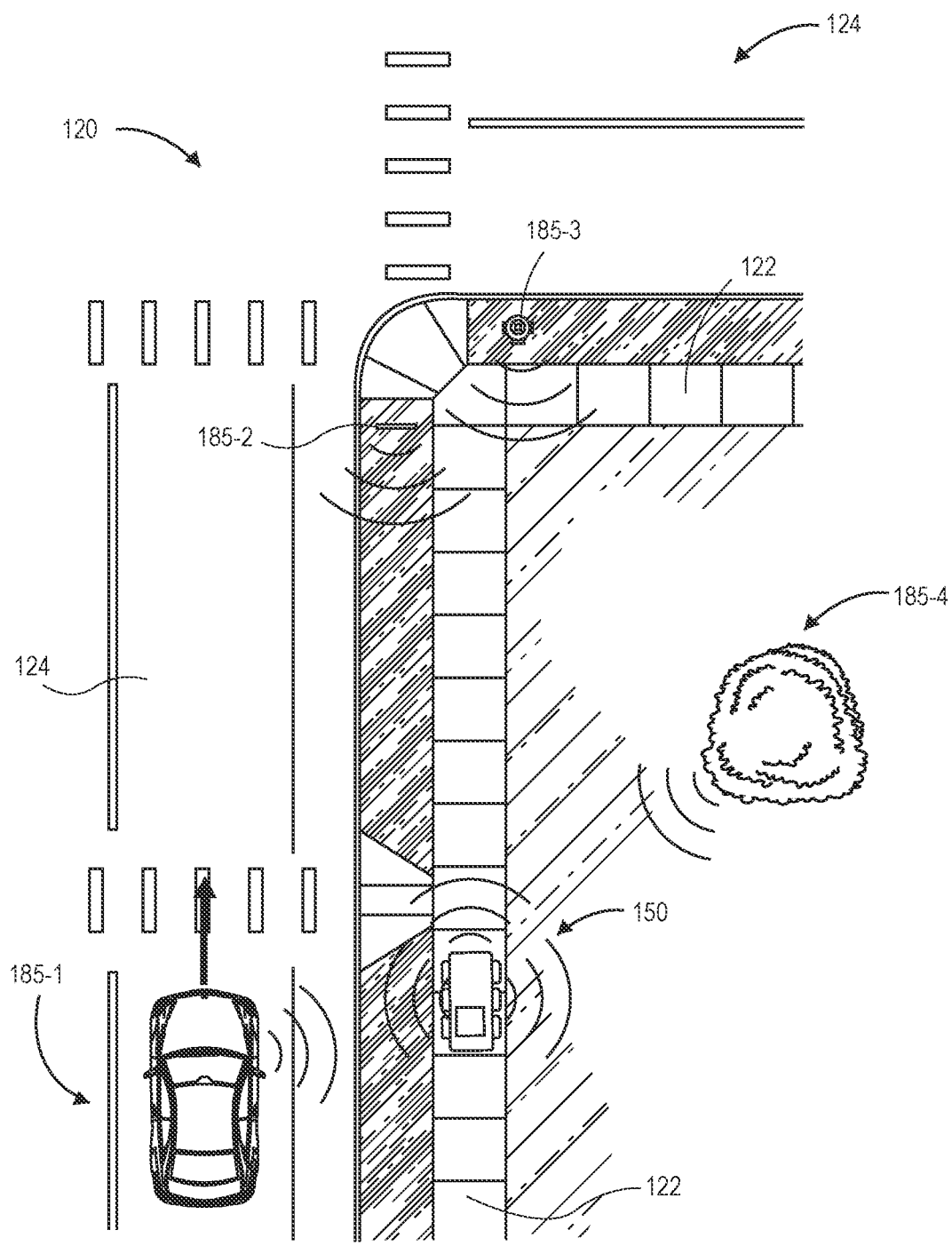

As is shown in FIG. 1B, the autonomous ground vehicle 150 transmits electromagnetic energy from each of the radar sensors 162-1, 162-2, 162-3 at discrete times and receives reflections of the electromagnetic energy from objects within the area 120. In particular, the radar sensors 162-1, 162-2, 162-3 of the autonomous ground vehicle 150 receive reflections from objects 185-1, 185-2, 185-3, 185-4, viz., an automobile 185-1 in motion on one of the streets 124, as well as a sign 185-2 (e.g., a "stop" sign, a "yield" sign, or any other sign or other object provided by a public authority or private entity) or a fire hydrant 185-3 adjacent an intersection of two of the streets 124, and a tree 185-4 or another element of plant life.

Figure 1C:
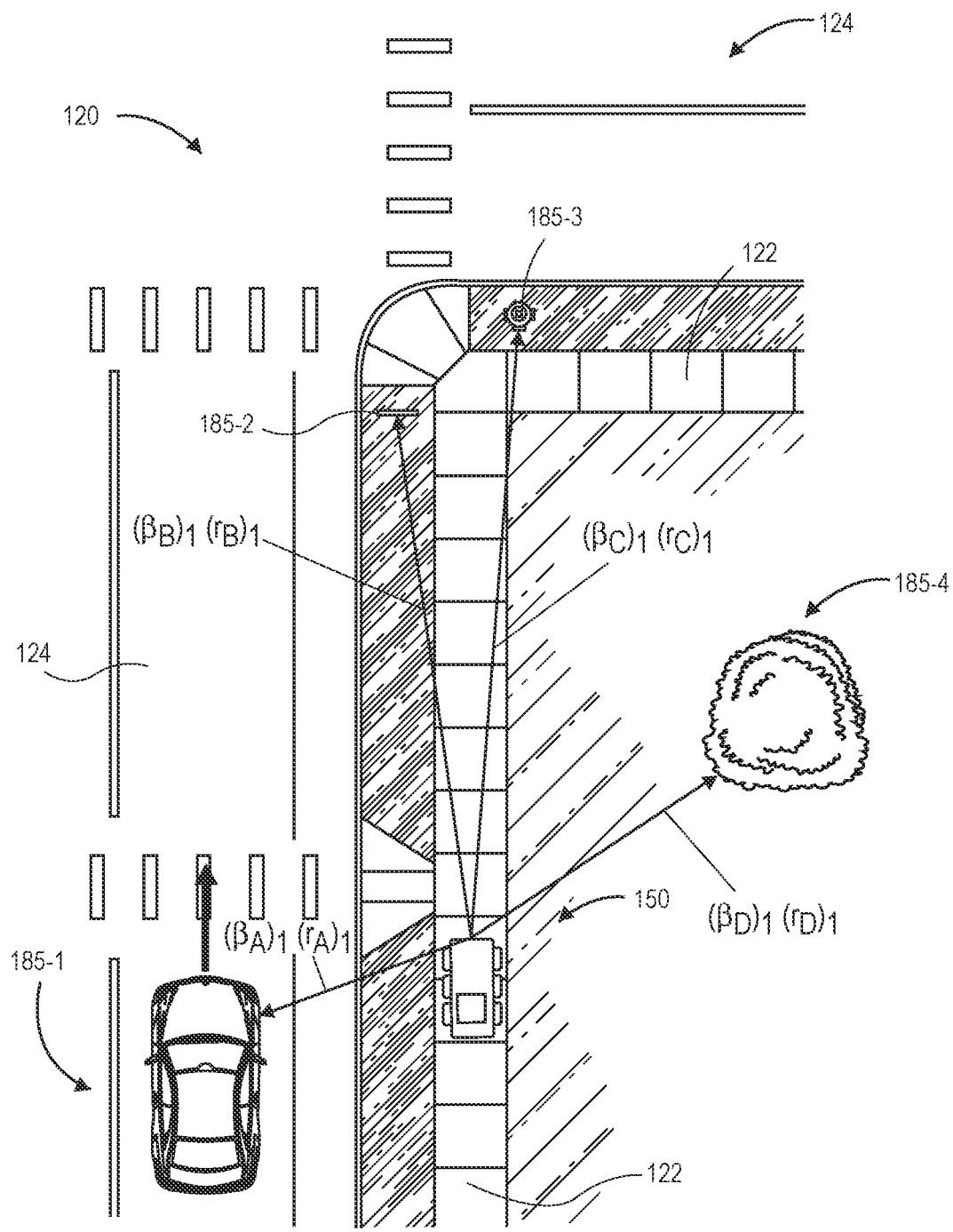

As is shown in FIG. 1C, the electromagnetic energy received by the radar sensors 162-1, 162-2, 162-3 (e.g., radar scans) may be interpreted to detect the objects 185-1, 185-2, 185-3, 185-4, and to determine bearings and ranges from a position of the autonomous ground vehicle at a time that the electromagnetic energy was transmitted or received to positions of such objects 185-1, 185-2, 185-3, 185-4. For example, as is shown in FIG. 1C, the autonomous ground vehicle 150 determines a bearing $(\beta_A)_1$ and a range $(r_A)_1$ to a detection A corresponding to the automobile 185-1 at a time 1. The autonomous ground vehicle 150 also determines a bearing $(\beta_B)_1$ and a range $(r_B)_1$ to a detection B corresponding to the sign 185-2, a bearing $(\beta_C)_1$ and a range $(r_C)_1$ to a detection (corresponding to the fire hydrant 185-3, and a bearing $(\beta_D)_1$ and a range $(r_D)_1$ to a detection D corresponding to the tree 185-4 at the time 1.

Figure 1D:
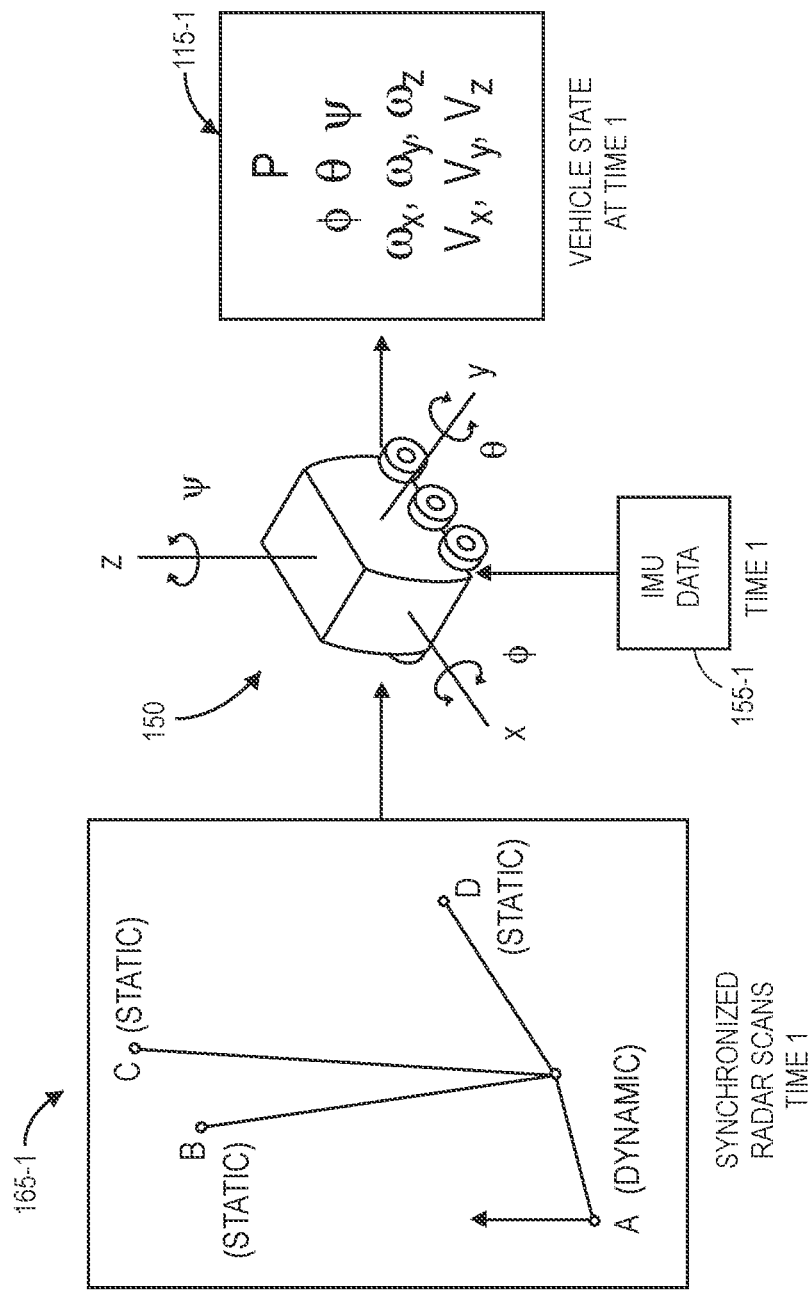

As is shown in FIG. 1D, the autonomous ground vehicle 150 synchronizes the radar scans received by the respective radar sensors 162-1, 162-2, 162-3 and inertial measurement unit data 155-1 captured at the time 1 into a single data structure 165-1. The inertial measurement unit data 155-1 may include but need not be limited to velocities and accelerations along or about one or more principal axes of the autonomous ground vehicle 150, e.g., the normal axis (or yaw axis), the lateral axis (or pitch axis), or the longitudinal axis (or roll axis) of the autonomous ground vehicle 150.

As is shown in FIG. 1D, the autonomous ground vehicle 150 processes the data structures 165-1 and the inertial measurement unit data 155-1 captured at the time 1 to estimate a state 115-1 of the vehicle at the time 1. The state 115-1 includes a position P of the vehicle at the time 1, as well as an orientation of the autonomous ground vehicle 150 at the time 1, e.g., a yaw angle ψ, a pitch angle θ and a roll angle φ, and angular velocities $\omega_x$, $\omega_y$, $\omega_z$ and linear velocities $V_x$, $V_y$, $V_z$ of the autonomous ground vehicle 150 at the time 1. The state 115-1 may be stored in one or more data stores or memory components provided aboard the autonomous ground vehicle 150, transmitted by the autonomous ground vehicle 150 to one or more external computer devices or systems, or utilized for any purpose.

Figure 1E:
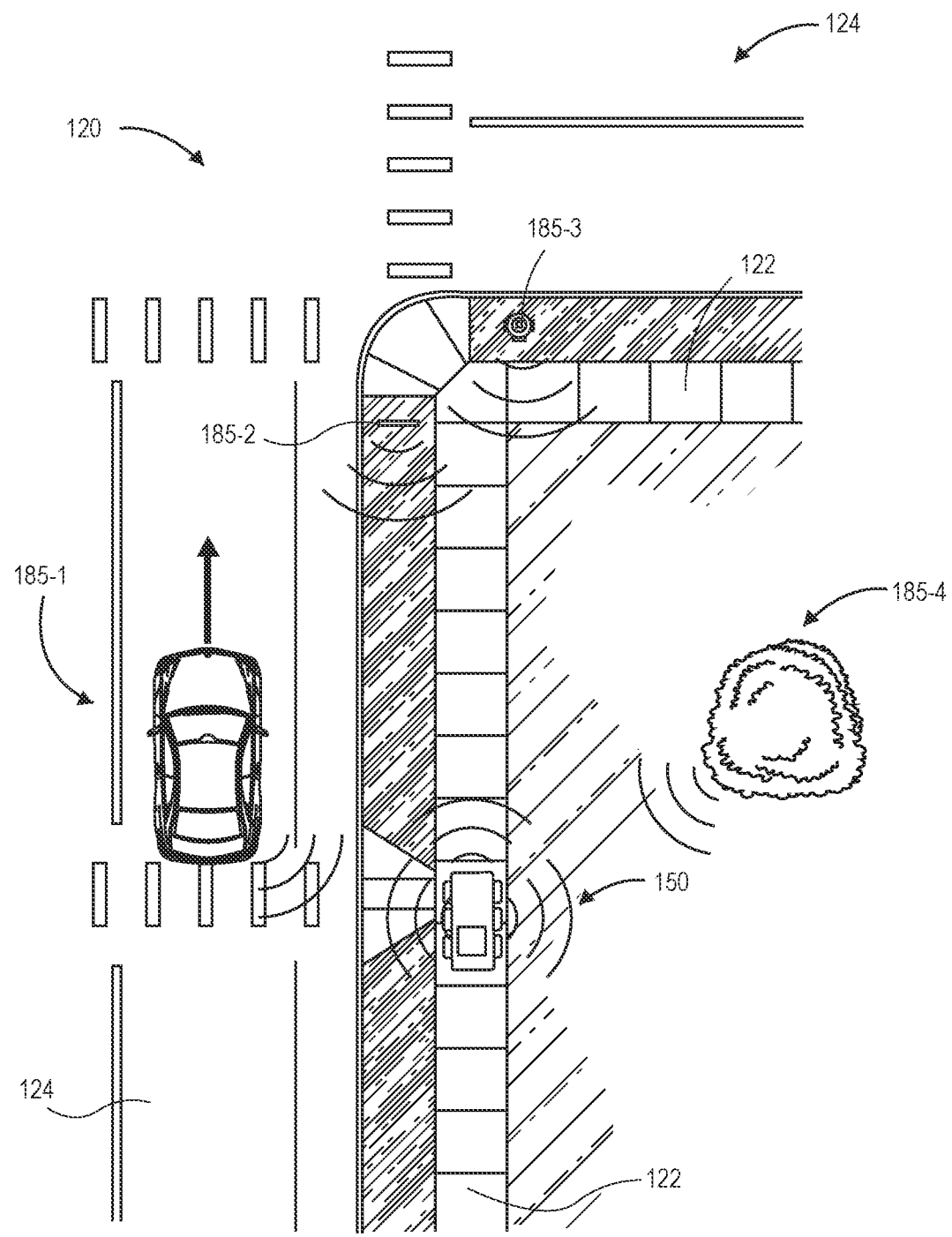

As the autonomous ground vehicle 150 continues ground operations in the area 120, the autonomous ground vehicle 150 continues to capture radar scans using the radar sensors 162-1, 162-2, 162-3 and inertial measurement unit data using the inertial measurement unit 162-4. For example, as is shown in FIG. 1E, the autonomous ground vehicle 150 transmits electromagnetic energy from each of the radar sensors 162-1, 162-2, 162-3 at discrete times and receives reflections of the electromagnetic energy from objects within the area 120, viz., the automobile 185-1, the sign 185-2, the fire hydrant 185-3, and the tree 185-4.

Figure 1F:
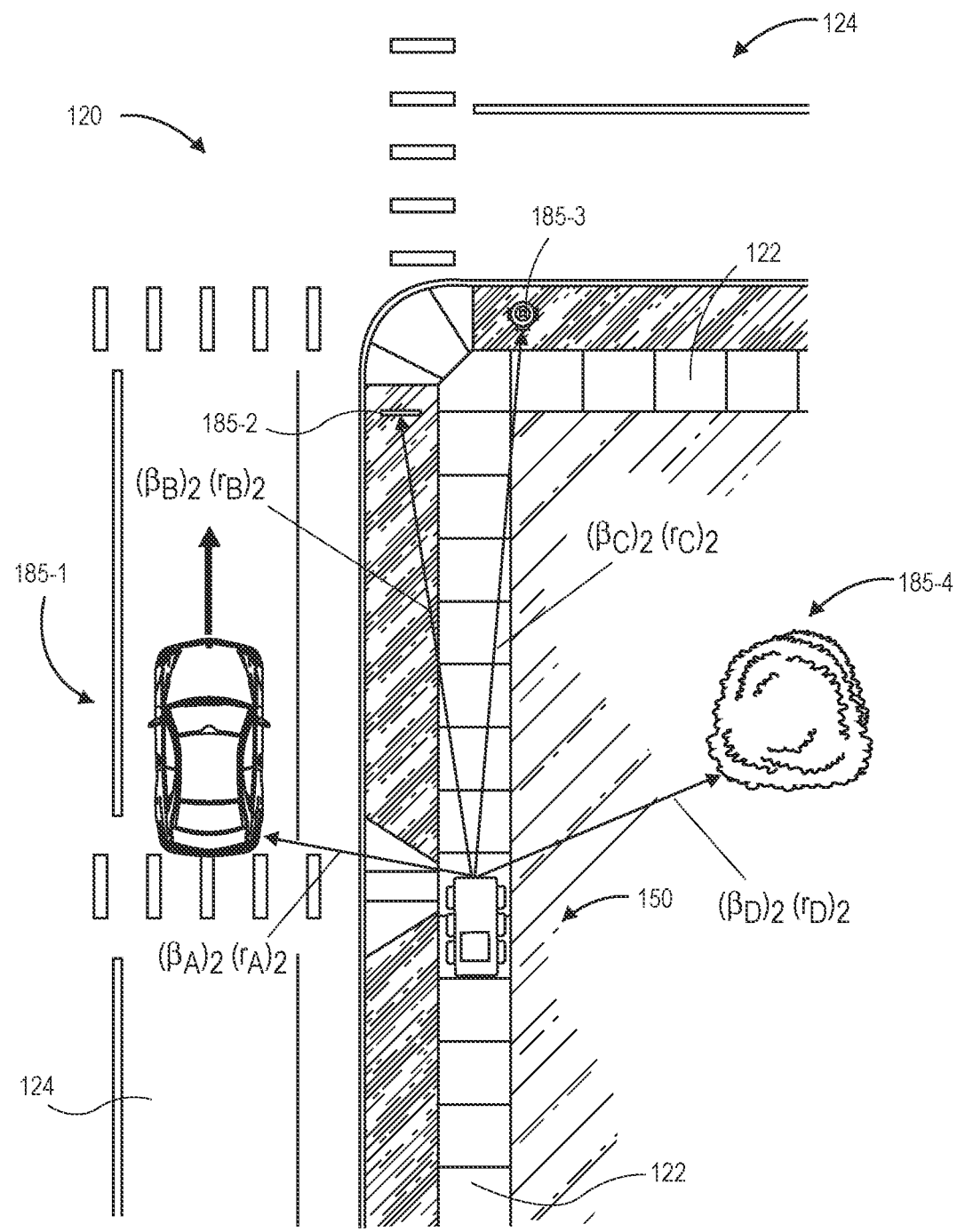

As is shown in FIG. 1F, the autonomous ground vehicle 150 interprets the electromagnetic energy received by the radar sensors 162-1, 162-2, 162-3 to detect the objects 185-1, 185-2, 185-3, 185-4, and determines a bearing $(\beta_A)_2$ and a range $(r_A)_2$ to a detection A corresponding to the automobile 185-1, a bearing $(\beta_B)_2$ and a range $(r_B)_2$ to a detection B corresponding to the sign 185-2, a bearing $(\beta_C)_2$ and a range $(r_C)_2$ to a detection (corresponding to the fire hydrant 185-3, and a bearing $(\beta_D)_2$ and a range $(r_D)_2$ to a detection D corresponding to the tree 185-4 at a time 2.

Figure 1G:
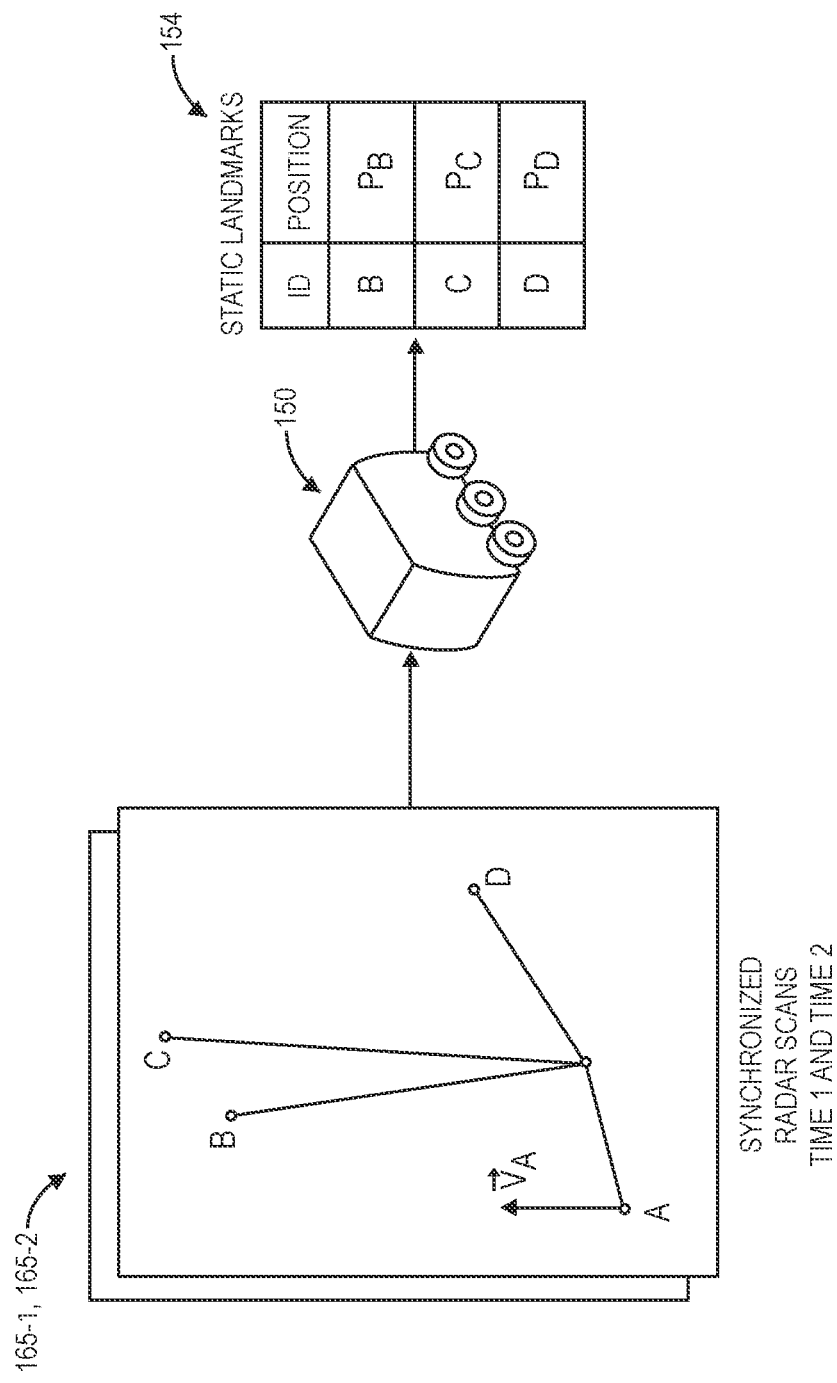

As is shown in FIG. 1G, the autonomous ground vehicle 150 processes the data structure 165-1 and a single data structure 165-2 representing synchronized radar scans received by the respective radar sensors 162-1, 162-2, 162-3 captured at the time 2 to generate a set of static landmarks 154, viz., the detections B, C, D) corresponding to the sign 185-2, the fire hydrant 185-3 and the tree 185-4, which are stationary or move infrequently. The set of static landmarks 154 includes identifiers of such landmarks, as well as their respective positions $P_B$, $P_C$, $P_D$. Alternatively, the set of static landmarks 154 may further include identifiers of the bearings $(\beta_B)_2$, $(B_C)_2$, $(B_D)_2$ and the ranges $(r_B)_2$, $(r_C)_2$, $(r_D)_2$ to the landmarks at time 2, as determined from the data structure 165-2, or any other information or data regarding the sign 185-2, the fire hydrant 185-3 or the tree 185-4.

Objects that are dynamic in nature, or are in motion, may be distinguished from objects that are static in nature, or are stationary, based on raw data scans, either individually or as represented in the data structure 165-2. In some implementations, a random sample consensus method, or a "RANSAC" method, to determine which detections represented in the radar scans represent dynamic objects, or objects in motion, and which detections represent landmarks, or objects that do not move or move infrequently. In some implementations, the detections may be transformed to a common frame of reference, and considered collectively. For example, a dynamic object may be an automobile, e.g., the automobile 185-1, as well as a bicycle, a pedestrian, an animal (e.g., a dog or another pet) or any other moving object, and may be identified as such from the data structure 165-2, or data structures including radar scan data captured prior or subsequent to the time 2.

Figure 1H:
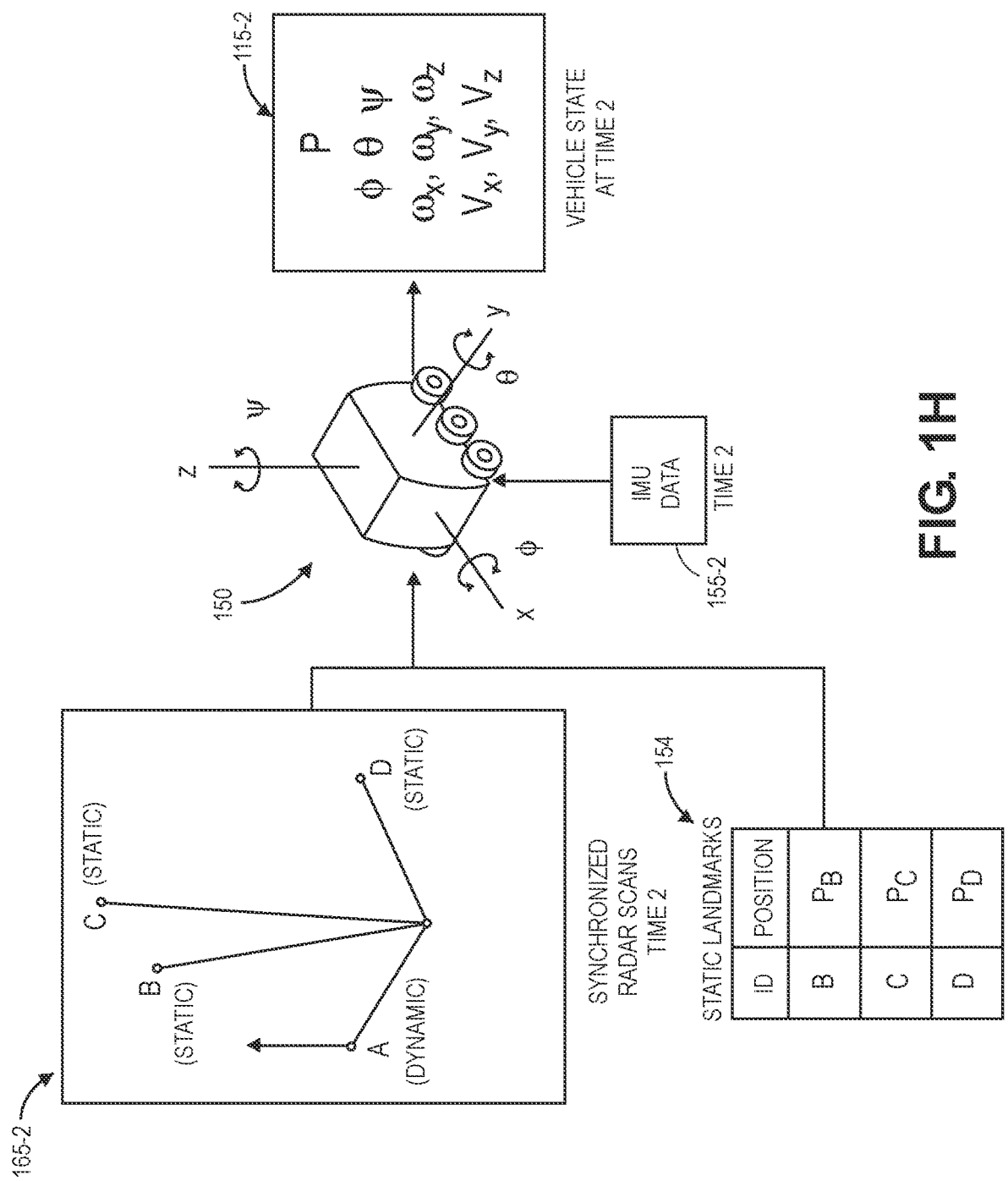

As is shown in FIG. 1H, the autonomous ground vehicle 150 processes the data structure 165-2 representing the radar scans received by the respective radar sensors 162-1, 162-2, 162-3 at the time 2, and the set of static landmarks 154, which are stationary or move infrequently.

The autonomous ground vehicle 150 then estimates a state 115-2 of the vehicle at the time 2. The state 115-2 includes a position P of the vehicle at the time 2, as well as an orientation of the autonomous ground vehicle 150 at the time 2, e.g., a yaw angle ψ, a pitch angle θ and a roll angle ¢, and angular velocities and linear velocities of the autonomous ground vehicle 150 at the time 2. The state 115-2 may be stored in one or more data stores or memory components provided aboard the autonomous ground vehicle 150, transmitted by the autonomous ground vehicle 150 to one or more external computer devices or systems, or utilized for any purpose.

Accordingly, the systems and methods of the present disclosure may be directed to radar-inertial odometry techniques for determining positions, orientations, velocities or other information or data regarding states of autonomous ground vehicles at times, based on radar scans or other radar data, and inertial measurement unit data, subject to constraints determined based on such data. In particular, the systems and methods of the present disclosure may rely on landmarks detected in radar scans to enhance estimates of orientation and velocity in three dimensions that are determined from inertial measurement unit data.

An inertial measurement unit is a component that may be installed within or mounted to an autonomous ground vehicle and configured to detect changes in linear or rotational motion of the autonomous ground vehicle, e.g., by one or more gyroscopes, accelerometers, magnetometers, or other sensors provided therein. For example, an inertial measurement unit may be configured to detect changes in linear and/or angular motion along the one or more principal axes of the autonomous ground vehicle, e.g., the normal axis (or yaw axis), the lateral axis (or pitch axis), or the longitudinal axis (or roll axis) of the autonomous ground vehicle. The gyroscopes (or other rotation sensing units), the accelerometers (or other acceleration sensing units) and the magnetometers (e.g., compasses or other magnetism sensing units) of an inertial measurement unit may be configured to determine angular velocities, accelerations and magnetic fields, respectively, either as individual sensing structures or as component parts of a common unit, e.g., a three-axis gyroscope or a three-axis accelerometer. In response to sensed angular velocities, accelerations or magnetic fields, the inertial measurement unit may return one or more signals representing aspects of an orientation of the autonomous ground vehicle, and such signals may be utilized for any purpose, including but not limited to initiating or controlling the operation of one or more propulsion motors, control surfaces or other systems.

An autonomous ground vehicle may further include one or more systems or components for determining a position of the autonomous ground vehicle, e.g., a latitude and a longitude corresponding to a ground-based position of the autonomous ground vehicle, or a latitude, a longitude and an elevation of a position of the autonomous ground vehicle in three-dimensional space. For example, the autonomous ground vehicle may include a locating module that obtains a geocode or other data regarding a location of the autonomous ground vehicle at an associated level of accuracy or tolerance, including but not limited to one or more GPS sensors, microchips or other components that determine locations by interpreting signals received from one or more GPS satellites. Such components typically operate by measuring the transit times of GPS signals received from multiple satellites, which generally travel at the speed of light, and determining distances to the respective satellites based on the transit times. Using three or more such signals, an approximate position of a computer device may be determined to within a defined degree or level of accuracy. Other positioning systems, such as the Galileo GNSS System operated by the European Space Agency, or the BeiDou Navigation Satellite System operated by China, also rely on satellites to provide position data to ground-based receivers.

The autonomous ground vehicles of the present disclosure may be vehicles having any number of wheels mounted to axles that may be rotated by one or more motors, with dimensions, masses or other indicators of size that may be selected on any basis. For example, in some implementations, the autonomous ground vehicles may be sized and configured to travel on roads, sidewalks, crosswalks, bicycle paths, trails or the like, as well as yards, parking lots, driveways, patios or other surfaces, at various times or during various levels of congestion, and at various speeds, e.g., in response to one or more computer-based instructions.

Additionally, autonomous ground vehicles of the present disclosure may include a cargo bay or other storage compartment, or multiple cargo bays or storage compartments, for maintaining items therein at any desired temperature, pressure or alignment or orientation, and to protect such items against the elements. Furthermore, in some implementations, the autonomous ground vehicles may include various equipment or components for determining whether a cargo bay or other storage compartment is empty or includes one or more items, or for identifying specific items that are stored therein, along with equipment or components for engaging or interacting with such items. The autonomous ground vehicles may also include one or more display screens (e.g., touchscreen displays, scanners, keypads) having one or more user interfaces for displaying information regarding such vehicles or their contents to humans, or for receiving interactions (e.g., instructions) from such humans, or other input/output devices for such purposes.

Moreover, the autonomous ground vehicles of the present disclosure may include any number of sensors such as imaging sensors (e.g., digital cameras or other imaging devices) or other sensors, including but not limited to speedometers, inclinometers, compasses, altimeters, gyroscopes or scanners. The autonomous ground vehicles of the present disclosure may also include communications equipment (e.g., wired or wireless means for communication such as components or systems operating Wireless Fidelity (or "Wi-Fi"), Bluetooth®, near-field communications or cellular technologies or protocols), along with one or more power modules (e.g., batteries), which may be rechargeable, refuelable or replaceable in nature. Information or data obtained or determined by such sensors or such communications equipment may be utilized in manually or automatically controlling an autonomous ground vehicle, e.g., in causing the autonomous ground vehicle to travel along one or more paths or routes, to search for alternate paths or routes, or to avoid expected or unexpected hazards encountered by the autonomous ground vehicle while traveling along such paths or routes. The autonomous ground vehicles of the present disclosure may further include any number of computer components (e.g., processors, data stores, transceivers or input/output devices) for performing any of the tasks or executing any of the functions described herein.

In still other implementations, autonomous ground vehicles may be programmed or otherwise configured to automatically access one or more predetermined or specified locations, e.g., to automatically deliver an item to a given location or to retrieve items from the given location. For example, an autonomous ground vehicle may be programmed or instructed to automatically open a door or other entry point at a facility (e.g., a private dwelling or business location), to access a public garage or other parking or standing area, or to activate an indicator within a home, an office or another structure. An autonomous ground vehicle may be configured to transmit wireless codes, signals or other information to trigger a response from one or more devices or machines equipped with wireless transceivers, such as garage door openers, doorbells, lights, haptic feedback systems or other machines or devices. Alternatively, requests or instructions for granting access to locations on behalf of an autonomous ground vehicle may be transmitted by one or more external computer devices or resources to one or more devices associated with structures at the locations, and access to such locations may be granted accordingly. Such requests or instructions may include access codes, authenticators, keys, tokens or similar information, which may be used by an autonomous ground vehicle to obtain access to one or more structures at a given location.

The autonomous ground vehicles of the present disclosure may be configured for travel on any type or form of surfaces associated with a transportation infrastructure network. In some implementations, the autonomous ground vehicle may be particularly configured for travel on sidewalks or other limited access passageways that are generally designed for travel by humans or other animals on foot, or by lightweight vehicles such as strollers or bicycles. For example, in some implementations, sidewalks or like passageways traveled upon by autonomous ground vehicles of the present disclosure may include residential sidewalks, commercial sidewalks, or any other type or form of sidewalks, which may be formed from any material, including but not limited to asphalt, bituminous pavement, bricks, cement, cobblestone, composite materials, concrete, dirt, grass, gravel, pavers, or any other materials.

Additionally, sidewalks may include various frontage zones or buffer zones and may be defined or established with respect to neighboring parcels (e.g., front yards, buildings, parking lots) by curbs, fences, walls, or other natural or artificial barriers of any type or form. Additionally, such sidewalks may include or be positioned near lights (e.g., street lights), furniture (e.g., benches, chairs, tables or planters), parking facilities (e.g., parking spaces and/or meters), shelters for passengers awaiting livery vehicles, buses or trains, as well as commercial vehicles such as trucks, vans or carts. Sidewalks may also include aprons, ramps, stairs, warning strips, or other facilities. Sidewalks may have any appropriate shapes or dimensions (e.g., widths, lengths, thicknesses), and may be flat or aligned at any angle or pitch, which may be selected on any basis or factor relating to anticipated travel thereon during use.

Those of ordinary skill in the pertinent arts will recognize that the autonomous ground vehicles of the present disclosure are not limited to traveling on sidewalks, however.

Figure 2A:
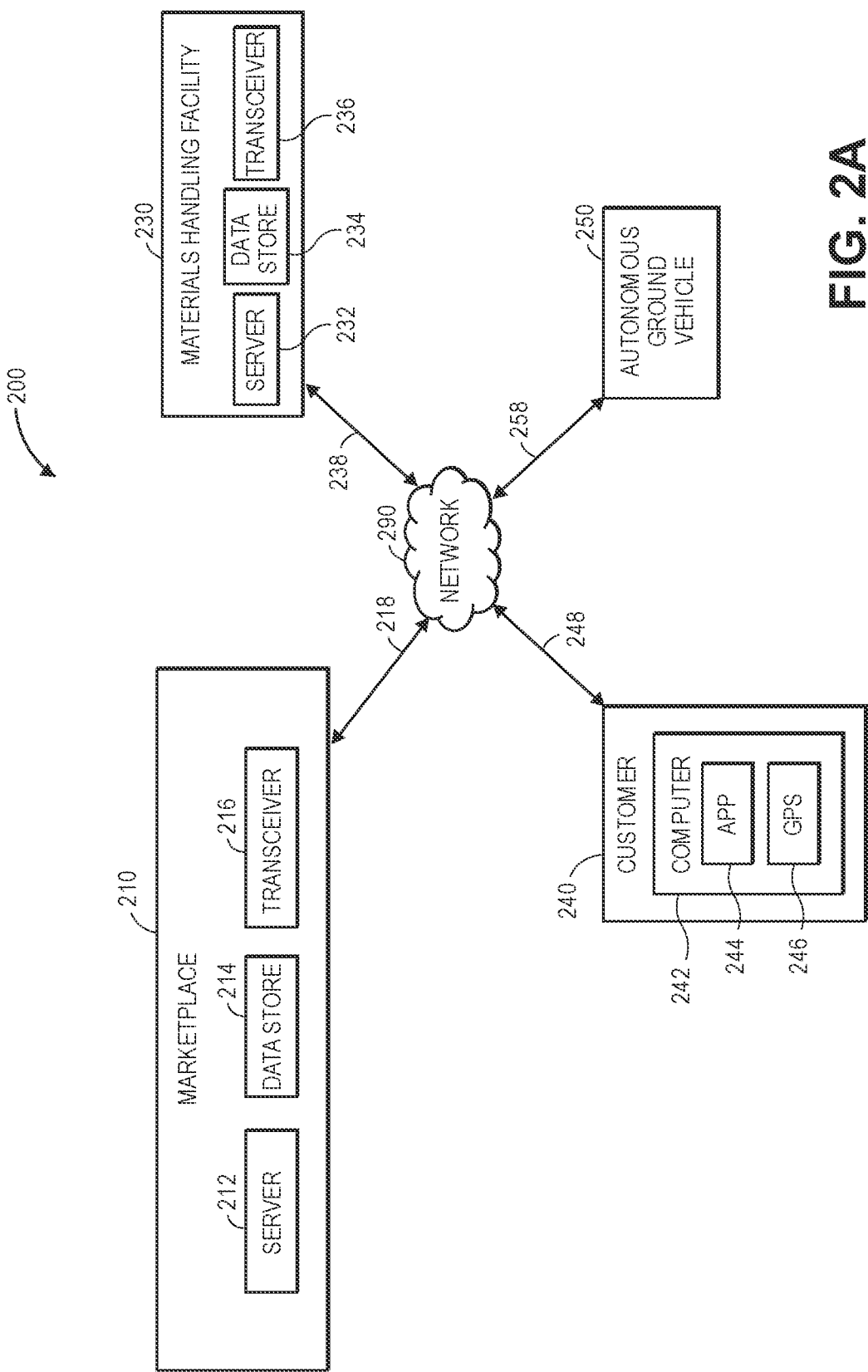
FIGS. 2A and 2B are block diagrams of components of one system for radar-inertial odometry in accordance with implementations of the present disclosure.
Figure 2B:
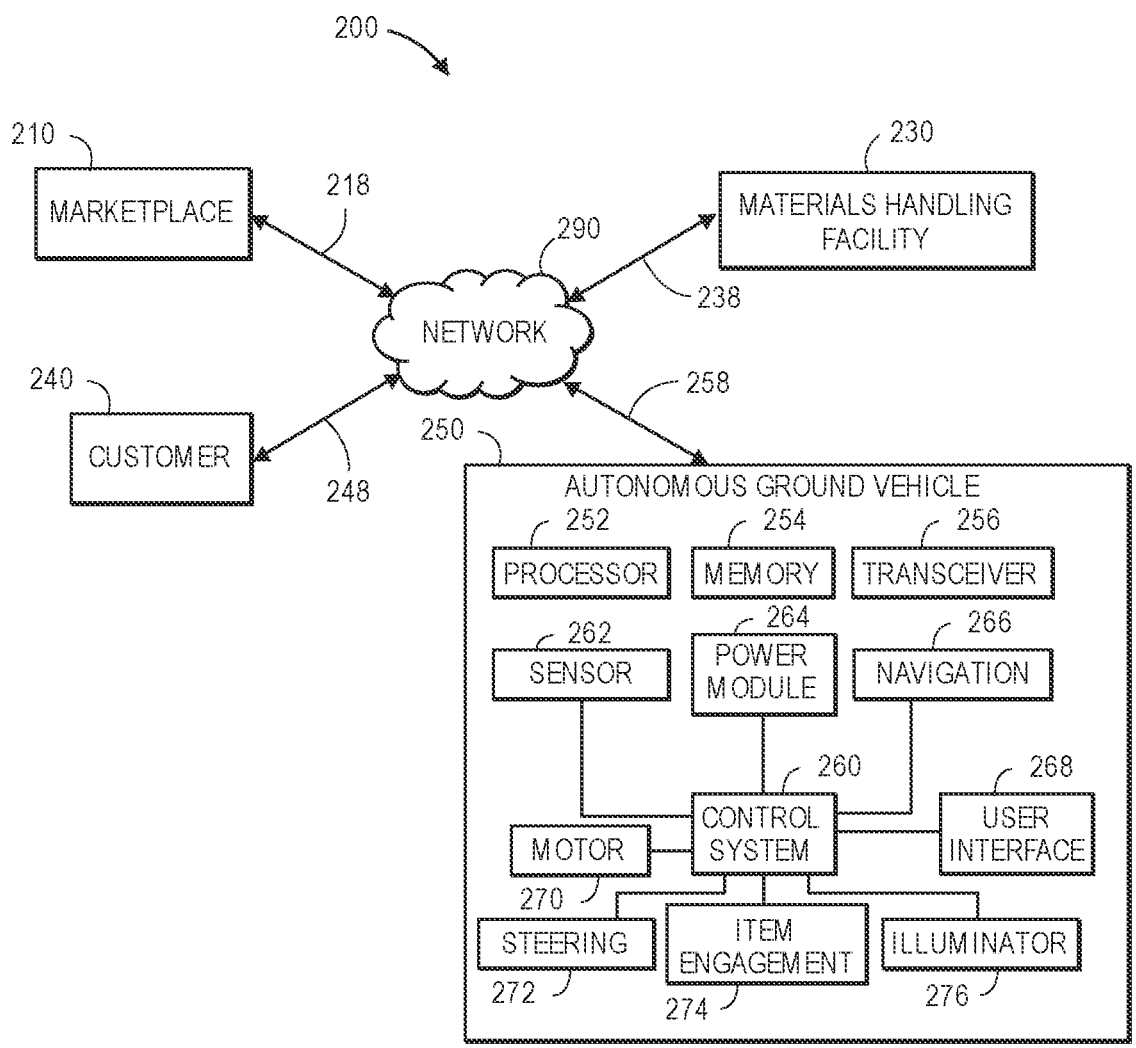

Referring to FIGS. 2A and 2B, a block diagram of components of one system 200 for radar-inertial odometry in accordance with implementations of the present disclosure is shown. The system 200 includes a marketplace (e.g., an online marketplace, or an electronic marketplace) 210, a materials handling facility 230, a customer 240 and an autonomous ground vehicle 250 that are connected to one another across a network 290, which may include the Internet in whole or in part. Except where otherwise noted, reference numerals preceded by the number "2" in FIG. 2A or FIG. 2B refer to elements that are similar to elements having reference numerals preceded by the number "1" shown in FIGS. 1A through 1H.

The marketplace 210 may be any entity or individual that wishes to make items (which may include goods, products, services or information of any type or form) from a variety of sources (e.g., vendors, manufacturers, merchants or sellers) available for download, purchase, rent, lease or borrowing by customers using a networked computer infrastructure, including one or more physical computer servers 212 and data stores 214 (e.g., databases) for hosting one or more network sites and one or more transceivers 216 or other communications systems.

The marketplace 210 may be physically or virtually associated with one or more storage or distribution facilities, such as the materials handling facility 230, and may implement the one or more network sites using the one or more servers 212, e.g., by connecting or otherwise communicating with the one or more data stores 214 as well as the network 290, through the sending and receiving of digital data as indicated by line 218. Moreover, the data stores 214 may include any type of information regarding items that have been made available for sale through the marketplace 210, or ordered by customers, such as the customer 240, from the marketplace 210, or any information or data regarding the delivery of such items to the customers. The data stores 214 may include any information or data regarding customers and items that the customers prefer or disfavor, including but not limited to histories of searching or browsing for information or data regarding such items, e.g., by way of one or more network sites maintained by the marketplace 210, or histories of purchasing such items or considering such items for purchase.

The server 212 may be a uniprocessor system including one processor, or a multiprocessor system including several processors (e.g., two, four, eight, or another suitable number), and may be capable of executing instructions. For example, in some implementations, the server 212 may be a general-purpose or embedded processor unit such as a CPU or a GPU having any number of instruction set architectures (or "ISA"), such as the x86, PowerPC, SPARC, or MIPS ISAs, or any other suitable ISA. Where the server 212 is a multiprocessor system, each of the processors within the multiprocessor system may operate the same ISA, or different ISAs.

Additionally, the data stores 214 may be implemented using any suitable memory technology, such as random-access memory (or "RAM"), static RAM (or "SRAM"), synchronous dynamic RAM (or "SDRAM"), nonvolatile/ Flash-type memory, or any other type of memory. The transceiver 216 may be configured to enable the marketplace 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the marketplace 210, or to one or more other computer devices or systems (e.g., the autonomous ground vehicle 250 or one or more other vehicles, not shown) via the network 290. The transceiver 216 may perform any necessary protocol, timing or other data transformations in order to convert data signals from a first format suitable for use by one component into a second format suitable for use by another component. In some implementations, the transceiver 216 may include support for devices attached through various types of peripheral buses, e.g., variants of the Peripheral Component Interconnect (PCI) bus standard or the Universal Serial Bus (USB) standard. In some other implementations, functions of the transceiver 216 may be split into two or more separate components, or integrated with the server 212.

The materials handling facility 230 may be any facility that is adapted to receive, store, process and/or distribute items. As is shown in FIG. 2A, the materials handling facility 230 includes a server 232, a data store 234, and a transceiver 236. The materials handling facility 230 also includes stations for receiving, storing and distributing items to customers.

The server 232 and/or the data store 234 may operate one or more order processing and/or communication systems and/or software applications having one or more user interfaces, or communicate with one or more other computing devices or machines that may be connected to the network 290, as indicated by line 238, for transmitting or receiving information in the form of digital or analog data, or for any other purpose. For example, the server 232 and/or the data store 234 may also operate or provide access to one or more reporting systems for receiving or displaying information or data regarding orders for items received by the marketplace 210, and may provide one or more interfaces for receiving interactions (e.g., text, numeric entries or selections) from one or more operators, users, workers or other persons in response to such information or data. The server 232, the data store 234 and/or the transceiver 236 may be components of a general-purpose device or machine, or a dedicated device or machine that features any form of input and/or output peripherals such as scanners, readers, keyboards, keypads, touchscreens or like devices, and may further operate or provide access to one or more engines for analyzing the information or data regarding workflow operations, or the interactions received from the one or more operators, users, workers or persons.

For example, the server 232 and/or the data store 234 may be configured to determine an optimal path or route between two locations for the execution of a given mission or task to be executed by the autonomous ground vehicle 250, or by any other vehicle (not shown), such as according to one or more traditional shortest path or shortest route algorithms such as Dijkstra's Algorithm, Bellman-Ford Algorithm, Floyd-Warshall Algorithm, Johnson's Algorithm or a hub labeling technique. Additionally, the server 232 and/or the data store 234 may be configured to control or direct, or to recommend or suggest, collaboration between or among the customer 240 and/or one or more of the autonomous ground vehicles 250, or any other vehicles, in the performance of one or more tasks or in the execution of one or more functions. For example, the server 232 and/or the data store 234 may identify appropriate locations or rendezvous points where one or more humans, vehicles or other machines, e.g., the customer 240 and/or one or more of the autonomous ground vehicles 250, may meet in order to transfer inventory or materials therebetween, or for any other purpose.

The transceiver 236 may be configured to enable the materials handling facility 230 to communicate through one or more wired or wireless means, e.g., wired technologies such as Universal Serial Bus (or "USB") or fiber optic cable, or standard wireless protocols such as Bluetooth® or any Wi-Fi protocol, such as over the network 290 or directly. The transceiver 236 may include one or more of the properties or features of the transceiver 216 described herein, or any other properties or features.

The materials handling facility 230 may further include one or more control systems that may generate instructions for conducting operations at one or more receiving stations, storage areas and/or distribution stations. Such control systems may be associated with the server 232, the data store 234 and/or the transceiver 236, or with one or more other computing devices or machines, and may communicate by any known wired or wireless means, or with the marketplace 210, the customer 240 or the autonomous ground vehicle 250 over the network 290, as indicated by line 238, through the sending and receiving of digital data.

Additionally, the materials handling facility 230 may include one or more systems or devices (not shown in FIG. 2A or FIG. 2B) for locating or identifying one or more elements therein, such as cameras or other image recording devices. Furthermore, the materials handling facility 230 may also include one or more workers or staff members (not shown in FIG. 2A or FIG. 2B), who may handle or transport items within the materials handling facility 230. Such workers may operate one or more computing devices or machines for registering the receipt, retrieval, transportation or storage of items within the materials handling facility 230, or a general-purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The customer 240 may be any entity or individual that wishes to download, purchase, rent, lease, borrow or otherwise obtain items (which may include goods, products, services or information of any type or form) from the marketplace 210 or the materials handling facility 230, e.g., for delivery to a selected destination, or by any other means. The customer 240 may utilize one or more computing devices 242 (e.g., a smartphone, a tablet computer, a laptop computer, a desktop computer, a smart speaker, or computing devices provided in wristwatches, televisions, set-top boxes, automobiles or any other appliances or machines), or any other like machine, that may operate or access one or more software applications 244, such as a web browser or a shopping application, or a position sensor ("GPS") 246, and may be connected to or otherwise communicate with the marketplace 210, the materials handling facility 230 or the autonomous ground vehicle 250 through the network 290, as indicated by line 248, by the transmission and receipt of digital data. The position sensor 246 may be any device, component, system or instrument adapted to receive signals (e.g., trilateration data or information) relating to a position of the computing device 242, from one or more GPS satellites of a GPS network, or, alternatively, from one or more towers or beacons from a cellular telephone network, or from any other source (not shown).

The autonomous ground vehicle 250 may be any type or form of self-powered vehicle capable of being programmed or otherwise configured for autonomous travel between two points along one or more paths or routes, in the performance of one or more missions or tasks, based on one or more computer instructions. For example, one or more of the autonomous ground vehicles 250 may be configured to determine an optimal path or route between two locations for the execution of a given mission or task on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique. Such optimal paths or routes may, in some implementations, include one or more common locations or rendezvous points where an item or materials may be transferred between or among the autonomous ground vehicle 250, or one or more humans, machines or other vehicles.

As is shown in FIG. 2B, the autonomous ground vehicle 250 may include one or more computer components such as a processor 252, a memory 254 and a transceiver 256 in communication with one or more other computer devices that may be connected to the network 290, as indicated by line 258, in order to transmit or receive information in the form of digital or analog data, or for any other purpose. For example, the autonomous ground vehicle 250 may receive instructions or other information or data via the transceiver 256 regarding an item that is to be delivered by the autonomous ground vehicle 250 from the materials handling facility 230 to the customer 240, e.g., from the servers 212, 232 and/or the computing device 242, or from any other computing devices over the network 290. The transceiver 256 may be configured to enable the autonomous ground vehicle 250 to communicate through one or more wired or wireless means, e.g., wired technologies such as Universal Serial Bus (or "USB") or fiber optic cable, or standard wireless protocols such as Bluetooth® or any Wi-Fi protocol, such as over the network 290 or directly. The transceiver 256 may include one or more of the properties or features of the transceiver 216 or the transceiver 236 described herein, or any other properties or features.

As is shown in FIG. 2B, the autonomous ground vehicle 250 also includes one or more control systems 260, as well as one or more sensors 262, one or more power modules 264, one or more navigation modules 266, and one or more user interfaces 268. Additionally, the autonomous ground vehicle 250 further includes one or more motors 270, one or more steering systems 272, one or more item engagement systems (or devices) 274 and one or more illuminators 276 (or other feedback devices).

The autonomous ground vehicle 250 may be any type or form of vehicle. For example, in some implementations, one or more of the tasks or functions described herein as being performed by an autonomous ground vehicle may be performed by a ground vehicle that is outfitted with one or more of the sensors 262 described herein and is manned or otherwise operated manually, such as a remote-controlled car. Alternatively, the autonomous ground vehicle 250 may be a hovercraft, or any other vehicle or craft configured for travel over land or water surfaces, e.g., at low altitudes.

The control system 260 may include one or more software applications or hardware components configured for controlling or monitoring operations of one or more components such as the sensor 262, the power module 264, the navigation module 266, or the user interfaces 268, as well as the motors 270, the steering systems 272, the item engagement systems 274 and the illuminators 276, e.g., by receiving, generating, storing and/or transmitting one or more computer instructions to such components. The control system 260 may communicate with the marketplace 210, the materials handling facility 230 and/or the customer 240 over the network 290, as indicated by line 258, through the sending and receiving of digital data.

The sensor 262 may be a position sensor such as a GPS receiver in communication with one or more orbiting satellites or other components of a GPS system, or any other device or component for determining geolocations (e.g., geospatially-referenced point that precisely defines an exact location in space with one or more geocodes, such as a set of geographic coordinates, e.g., a latitude and a longitude, and, optionally, an elevation that may be ascertained from signals (e.g., trilateration data or information) or geographic information system (or "GIS") data), of the autonomous ground vehicle 250. Geolocations of the sensor 262 may be associated with the autonomous ground vehicle 250, where appropriate.

The sensor 262 may also be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the autonomous ground vehicle 250, or for any other purpose. For example, the sensor 262 may be configured to capture or detect reflected light if the reflected light is within a field of view of the sensor 262, which is defined as a function of a distance between an imaging sensor and a lens within the sensor 262, viz., a focal length, as well as a position of the sensor 262 and an angular orientation of the lens. Accordingly, where an object appears within a depth of field, or a distance within the field of view where the clarity and focus is sufficiently sharp, the sensor 262 may capture light that is reflected off objects of any kind to a sufficiently high degree of resolution using one or more sensors thereof, and store information regarding the reflected light in one or more data files.

The sensor 262 may also include manual or automatic features for modifying a field of view or orientation. For example, the sensor 262 may be a digital camera configured in a fixed position, or with a fixed focal length (e.g., fixed-focus lenses) or angular orientation. Alternatively, the sensor 262 may include one or more actuated or motorized features for adjusting a position of the sensor 262, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensor 262, or a change in one or more of the angles defining the angular orientation of the sensor 262.

For example, the sensor 262 may be an imaging device that is hard-mounted to a support or mounting that maintains the imaging device in a fixed configuration or angle with respect to one, two or three axes. Alternatively, however, the sensor 262 may be provided with one or more motors and/or controllers for manually or automatically operating one or more of the components, or for reorienting the axis or direction of the sensor 262, i.e., by panning or tilting the sensor 262. Panning the sensor 262 may cause a rotation within a horizontal plane or about a vertical axis (e.g., a yaw), while tilting the sensor 262 may cause a rotation within a vertical plane or about a horizontal axis (e.g., a pitch). Additionally, the sensor 262 may be rolled, or rotated about its axis of rotation, and within a plane that is perpendicular to the axis of rotation and substantially parallel to a field of view of the sensor 262.

Imaging data (e.g., still or moving images, as well as associated audio data or metadata) captured using the sensor 262 may be processed according to any number of recognition techniques. In some implementations, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, or does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods;

or any other algorithms or techniques that may be known to those of ordinary skill in the pertinent arts.

The sensor 262 may further be or include one or more compasses, speedometers, altimeters, inclinometers, thermometers, barometers, hygrometers, gyroscopes, air monitoring sensors (e.g., oxygen, ozone, hydrogen, carbon monoxide or carbon dioxide sensors), ozone monitors, pH sensors, moisture sensors, magnetic anomaly detectors, metal detectors, radiation sensors (e.g., Geiger counters, neutron detectors, alpha detectors), accelerometers, ranging sensors (e.g., radar, sonar or LIDAR ranging sensors) or sound sensors (e.g., microphones, piezoelectric sensors, vibration sensors or other transducers for detecting and recording acoustic energy from one or more directions).

The sensor 262 may be further configured to capture, record and/or analyze information or data regarding its positions, velocities, accelerations or orientations of the autonomous ground vehicle 250, and to analyze such data or information by one or more means, e.g., by aggregating or summing such data or information to form one or more qualitative or quantitative metrics of the movement of the sensor 262. For example, a net vector indicative of any and all relevant movements of the autonomous ground vehicle 250, including but not limited to physical positions, velocities, accelerations or orientations of the sensor 262, may be derived. Additionally, coefficients or scalars indicative of the relative movements of the autonomous ground vehicle 250 may also be defined.

Although the sensor 262 is shown as intrinsic to or onboard the autonomous ground vehicle 250, the autonomous ground vehicle 250 may utilize one or more sensors that are external to the autonomous ground vehicle 250 in the capture of information or data, or rely on information or data captured using such sensors, in accordance with the present disclosure. For example, the autonomous ground vehicle 250 may receive information or data regarding ground conditions at a location that was captured by one or more sensors at the location. Such external sensors may have any or all of the features or characteristics of the sensors 262 disclosed herein.

The power module 264 may be any type of power source for providing electrical power, mechanical power or other forms of power in support of one or more electrical or mechanical loads aboard the autonomous ground vehicle 250. In some implementations, the power module 264 may include one or more batteries or other power cells, e.g., dry cell or wet cell batteries such as lead-acid batteries, lithium-ion batteries, nickel cadmium batteries or nickel metal hydride batteries, or any other type, size or form of batteries. The power module 264 may each have any cell voltages, peak load currents, charge times, specific energies, internal resistances or cycle lives, or other power ratings. The power module 264 may also be any type, size or form of other power source, e.g., other than a battery, including but not limited to, one or more fuel cells, turbines, solar cells or others. Alternatively, the power module 264 may be another form of prime mover (e.g., electric, gasoline-powered or any other type of motor) capable of generating sufficient mechanical forces for the autonomous ground vehicle 250.

The navigation module 266 may include one or more software applications or hardware components including or having access to information or data regarding aspects of transportation systems within a given region or space, including the locations, dimensions, capacities, conditions, statuses or other attributes of various paths or routes in the region or space. For example, the navigation module 266 may receive inputs from the sensor 262, e.g., from a GPS receiver, an imaging device or another sensor, and determine an optimal direction and/or an optimal speed of the autonomous ground vehicle 250 for travelling on a given path or route based on such inputs. The navigation module 266 may select a path or route to be traveled upon by the autonomous ground vehicle 250, and may provide information or data regarding the selected path or route to the control system 260.

The user interface 268 may be configured to receive and provide information to human users and may include, but is not limited to, a display, (e.g., a touch-screen display), a scanner, a keypad, a biometric scanner, an audio transducer, one or more speakers, one or more imaging devices such as a video camera, and any other types of input or output devices that may support interaction between the autonomous ground vehicle 250 and a human user. In various implementations, the user interface 268 may include a variety of different features. For example, in one implementation, the user interface 268 may include a relatively small display and/or a keypad for receiving inputs from human users. In other implementations, inputs for controlling the operation of the autonomous ground vehicle 250 may be provided remotely. For example, in order to access a storage compartment, a human user may send a text message to or reply to a text message from the control system 260 and request that a door or other access portal be opened in order to enable the user to access an item therein. In various implementations, the autonomous ground vehicle 250 may have capabilities for directly receiving such signals from a user device or other device (e.g., a device inside a user's residence) that provides a signal to open the storage compartment door.

The motor 270 may be any type or form of motor or engine (e.g., electric, gasoline-powered or any other type of motor) that is capable of providing sufficient rotational forces to one or more axles, shafts and/or wheels for causing the autonomous ground vehicle 250 and any items therein to travel in a desired direction and at a desired speed. In some implementations, the autonomous ground vehicle 250 may include one or more electric motors having any number of stators, poles and/or windings, such as an outrunner or an inrunner brushless direct current (DC) motor, or any other motors, having any speed rating, power rating or any other rating.

The steering system 272 may be any system for controlling a direction of travel of the autonomous ground vehicle 250. The steering system 272 may include any number of automatically operable gears (e.g., racks and pinions), gear boxes, shafts, shaft assemblies, joints, servos, hydraulic cylinders, linkages or other features for repositioning one or more wheels to cause the autonomous ground vehicle 250 to travel in a desired direction.

The item engagement system 274 may be any mechanical component, e.g., a robotic arm, for engaging an item or for disengaging the item, as desired. For example, when the autonomous ground vehicle 250 is tasked with delivering items or materials from an origin to a destination, the item engagement system 274 may be used to engage the items or materials at the origin and to deposit the items or materials in a cargo bay or other storage compartment prior to departing. After the autonomous ground vehicle 250 arrives at the destination, the item engagement system 274 may be used to retrieve the items or materials within the cargo bay or storage compartment, and deposit the items or materials in a desired location at the destination.

In some implementations, the autonomous ground vehicle 250 may be programmed or configured to perform one or more missions or tasks in an integrated manner. For example, the control system 260 may be programmed to instruct the autonomous ground vehicle 250 to travel to an origin, e.g., the materials handling facility 230, and to begin the performance of a task there, such as by retrieving an item at the origin using the item engagement system 274, before proceeding to a destination, e.g., the customer 240, along a selected route (e.g., an optimal route). Along the way, the control system 260 may cause the motor 270 to operate at any predetermined speed and cause the steering system 272 to orient the autonomous ground vehicle 250 in a predetermined direction or otherwise as necessary to travel along the selected route, e.g., based on information or data received from or stored in the navigation module 266. The control system 260 may further cause the sensor 262 to capture information or data (including but not limited to imaging data) regarding the autonomous ground vehicle 250 and/or its surroundings along the selected route. The control system 260 or one or more other components of the autonomous ground vehicle 250 may be programmed or configured as necessary in order to execute any actions associated with a given task, in accordance with the present disclosure.

The illuminator 276 may be any light or light source that is configured to project light in one or more directions. For example, in some implementations, the illuminator 276 may be one or more light-emitting diodes (or "LED"), liquid crystal displays (or "LCD"), incandescent bulbs, compact and/or linear fluorescent bulbs, halogen lamps, metal halide lamps, neon lamps, sodium lamps or any other type or form of lights configured to project light at any frequency, wavelength or intensity. Alternatively, or in addition to the illuminator 276, the autonomous ground vehicle 250 may include one or more other feedback devices, including but not limited to components such as audio speakers or other physical components that may be automatically controlled or configured to generate audible messages, signals or sounds, or one or more haptic vibrating elements that may be automatically controlled or configured to generate tactile vibrations of any frequency or intensity.

Any combination of networks or communications protocols may be utilized in accordance with the systems and methods of the present disclosure. For example, each of the autonomous ground vehicles 250 may be configured to communicate with one another or with the servers 212, 232 and/or the computing device 242 via the network 290, such as is shown in FIGS. 2A and 2B, e.g., via an open or standard protocol such as Wi-Fi. Alternatively, each of the autonomous ground vehicles 250 may be configured to communicate with one another directly outside of a centralized network, such as the network 290, e.g., by a wireless protocol such as Bluetooth®, in which two or more of the autonomous ground vehicles 250 may be paired with one another.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "materials handling facility," a "customer," an "autonomous ground vehicle" (or "autonomous vehicle"), or like terms, may be automated steps performed by their respective computer systems, or implemented within software modules (or computer programs) executed by one or more general-purpose computers. Moreover, process steps described as being performed by a "marketplace," a "materials handling facility," a "customer," or an "autonomous ground vehicle" may be typically performed by a human operator, but could, alternatively, be performed by an automated agent. Moreover, as used herein, the term "materials handling facility" may include, but is not limited to, warehouses, distribution centers, cross-docking facilities, fulfillment centers, packaging facilities, shipping facilities, rental facilities, libraries, retail stores or establishments, wholesale stores, museums, or other facilities or combinations of facilities for performing one or more functions of material or inventory handling for any purpose.

The marketplace 210, the materials handling facility 230, the customer 240, or the autonomous ground vehicle 250 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, social network messages, marketplace messages, telephone calls or the like. For example, the materials handling facility 230 and/or the server 232 may be adapted to transmit information or data in the form of synchronous or asynchronous messages to the marketplace 210 and/or the server 212, the customer 240 and/or the computing device 242, the autonomous ground vehicle 250 and/or the control system 260, or any other computer device in real time or in near-real time, or in one or more offline processes, via the network 290. Those of ordinary skill in the pertinent art would recognize that the marketplace 210, the materials handling facility 230, the customer 240, or the autonomous ground vehicle 250 may operate any of a number of computing devices that are capable of communicating over the network 290, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 212, 232, the computing device 242, the processors 252 or any other computers or control systems utilized by the marketplace 210, the materials handling facility 230, the customer 240, or the autonomous ground vehicle 250, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMS, erasable programmable ROMs ("EPROM"), electrically erasable programmable ROMs ("EEPROM"), flash memory, magnetic or optical cards, solid-state memory devices, or other types of media/ machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
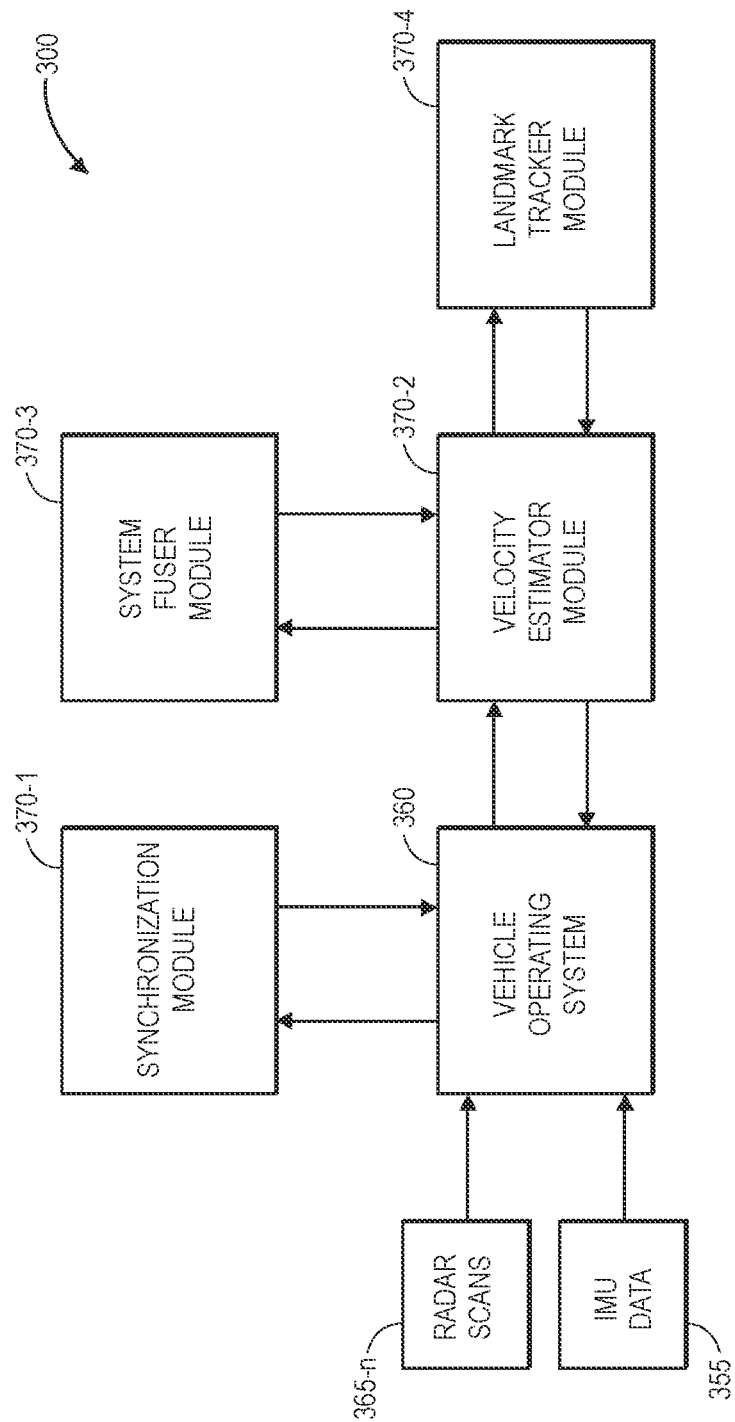
FIG. 3 is a flow diagram of components of one system for radar-inertial odometry in accordance with implementations of the present disclosure.

Referring to FIG. 3, a flow diagram of components of one system for radar-inertial odometry in accordance with implementations of the present disclosure is shown. Except where otherwise noted, reference numerals preceded by the number "3" in FIG. 3 refer to elements that are similar to elements having reference numerals preceded by the number "2" in FIG. 2A or FIG. 2B or by the number "1" shown in FIGS. 1A through 1H.

As is shown in FIG. 3, a system 300 may include a vehicle operating system 360 that is configured to receive radar scans 365-$n$ from each of n radar sensors provided aboard an autonomous ground vehicle, and configured to receive inertial measurement unit data 355 from one or more inertial measurement units and/or sensors provided aboard the autonomous ground vehicle. The vehicle operating system 360 may be a set of system software instructions or firmware executed by one or more processing units provided aboard the autonomous ground vehicle, and may be programmed in any language or according to any standard.

The system 300 further includes a plurality of modules 370-1, 370-2, 370-3, 370-4, including but not limited to a synchronization module 370-1, a velocity estimator module 370-2, a system fuser module 370-3 and a landmark tracker module 370-4. The synchronization module 370-1 may receive the radar scans 365-$n$ from the n radar sensors as inputs, e.g., on a continuous or streaming basis. The synchronization module 370-1 may identify radar scans that were captured at the same time, or at substantially the same time, based on timestamps of the respective radar scans or in any other manner. The synchronization module 370-1 may then combine and publish synchronized sets of radar scans that were captured at the same time in a single data structure, and return the synchronized sets of radar scans to the vehicle operating system 360.

The velocity estimator module 370-2 may receive the synchronized sets of radar scans that were captured at the same time and inertial measurement unit data 355 that was also captured at the same time, and generate sets of constraints (or factors) based on the synchronized sets of radar scans and the inertial measurement unit data. The constraints (or factors) may include one or more doppler factors that may constrain estimates of velocities determined by the inertial measurement unit, e.g., in a frame of the inertial measurement unit. In some implementations, doppler constraints (or factors) may be defined for each of a plurality of detections by an error function represented in Equation (1), below, $$e_d = \sum_{d \in D} \rho \left( -(R_{RI} v_I + t_{RI} R_{RI} \omega_I) \cdot \frac{p}{\|p\|} - r \right)^2 \qquad (1)$$

where D is a set of radar detections returned from a single scan, where p ( ) is a robust norm, where RRI is a rotation between the inertial measurement unit and the radar sensors, where/RI is a translation of the inertial measurement unit and the radar sensors, where vi is an estimated linear velocity of the autonomous ground vehicle within a frame of the inertial measurement unit, where or is an estimated linear velocity of the autonomous ground vehicle within a frame of the inertial measurement unit, and where r is a doppler measurement, e.g., an instantaneous rate of change in a range measurement, representing how fast an object is approaching or moving away from a radar sensor, for a detection d of the set of D radar detections.

The constraints (or factors) may also include pre-integrated inertial measurement unit constraints (or factors), which may constrain changes in velocities and orientations between adjacent states based on readings of accelerometers and gyroscopes represented in inertial measurement unit data.

The constraints (or factors) may further include radar landmark constraints (or factors), which constrain a heading of the autonomous ground vehicle. In some implementations, radar landmark constraints (or factors) may be defined for each of a plurality of landmarks detected in a current frame by an error function represented in Equation (2), below, $$e_l = \Sigma_{l \in L} \rho(\theta_l - \hat{\theta}_l)^2 \qquad (2)$$

where L is a set of landmarks that were detected in a current frame, Or is a bearing component of a measurement of a landmark/of the set L, and where Ô is a bearing to an estimated position of the landmark/of the set L.

The velocity estimator module 370-2 provides the constraints (or factors) calculated based on the synchronized sets of radar scans and the inertial measurement unit data to a system fuser module 370-3 that determines a state of the vehicle based on such constraints or factors. In some implementations, the system fuser module 370-3 may include a library of functions or applications in one or more programming applications that are configured to generate a state of the autonomous ground vehicle, e.g., a position of the autonomous ground vehicle, an orientation of the autonomous ground vehicle (which may be represented in a yaw angle, a pitch angle and a roll angle with respect to principal axes of the autonomous ground vehicle), and linear and angular velocities or accelerations along or about one or more of the principal axes of the autonomous ground vehicle. The system fuser module 370-3 may determine the state of the autonomous ground vehicle subject to the constraints (or factors).

Additionally, the landmark tracker module 370-4 may receive the synchronized sets of radar scans and a set of positions of landmarks, e.g., static objects, determined from previously captured sets of radar scans and determine which objects detected in the synchronized sets of radar scans correspond to the previously detected landmarks (or static objects). The landmark tracker module 370-4 may execute a random sample consensus method, or a "RANSAC" method, to determine which detections represented in the synchronized sets of radar scans represent dynamic objects, or objects in motion, and which detections represent landmarks, or objects that do not move or move infrequently. The random sample consensus method executed by the landmark tracker module 370-4 may identify and exclude or reject outliers, or dynamic objects, from consideration when determining states of the autonomous ground vehicle.

The landmark tracker module 370-4 may also update the set of positions of landmarks based on any new detections that are determined to be static.

Based on identified matches of landmarks detected in a synchronized set of radar scans and previously detected landmarks, the velocity estimator 370-2 may generate an odometry message, or a signal or message representing a state of the autonomous ground vehicle, and return the odometry message to the vehicle operating system 360, which may utilize the odometry message for any purpose.

Figure 4A:
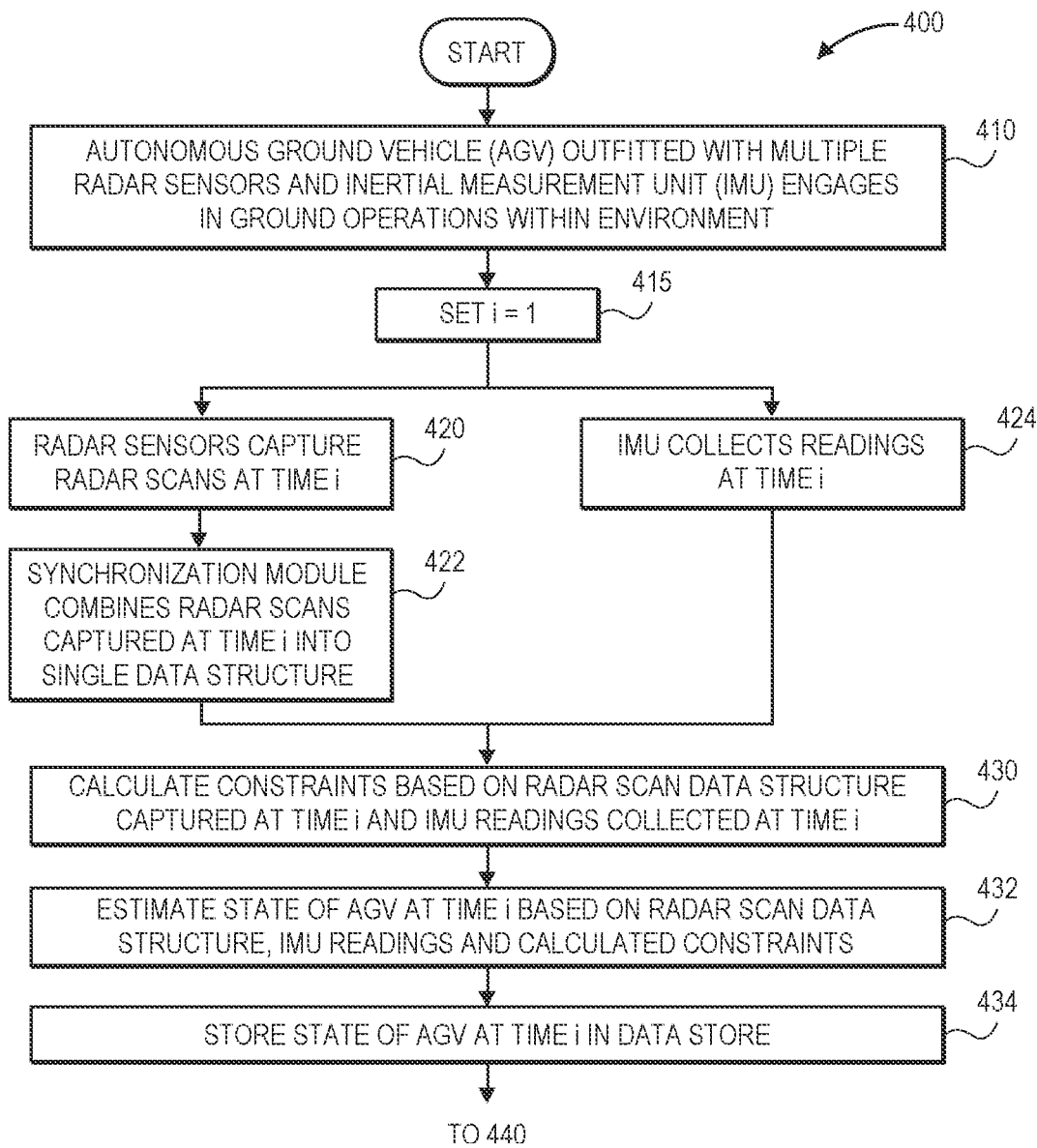
FIGS. 4A and 4B are a flow chart of one process for radar-inertial odometry in accordance with implementations of the present disclosure.
Figure 4B:
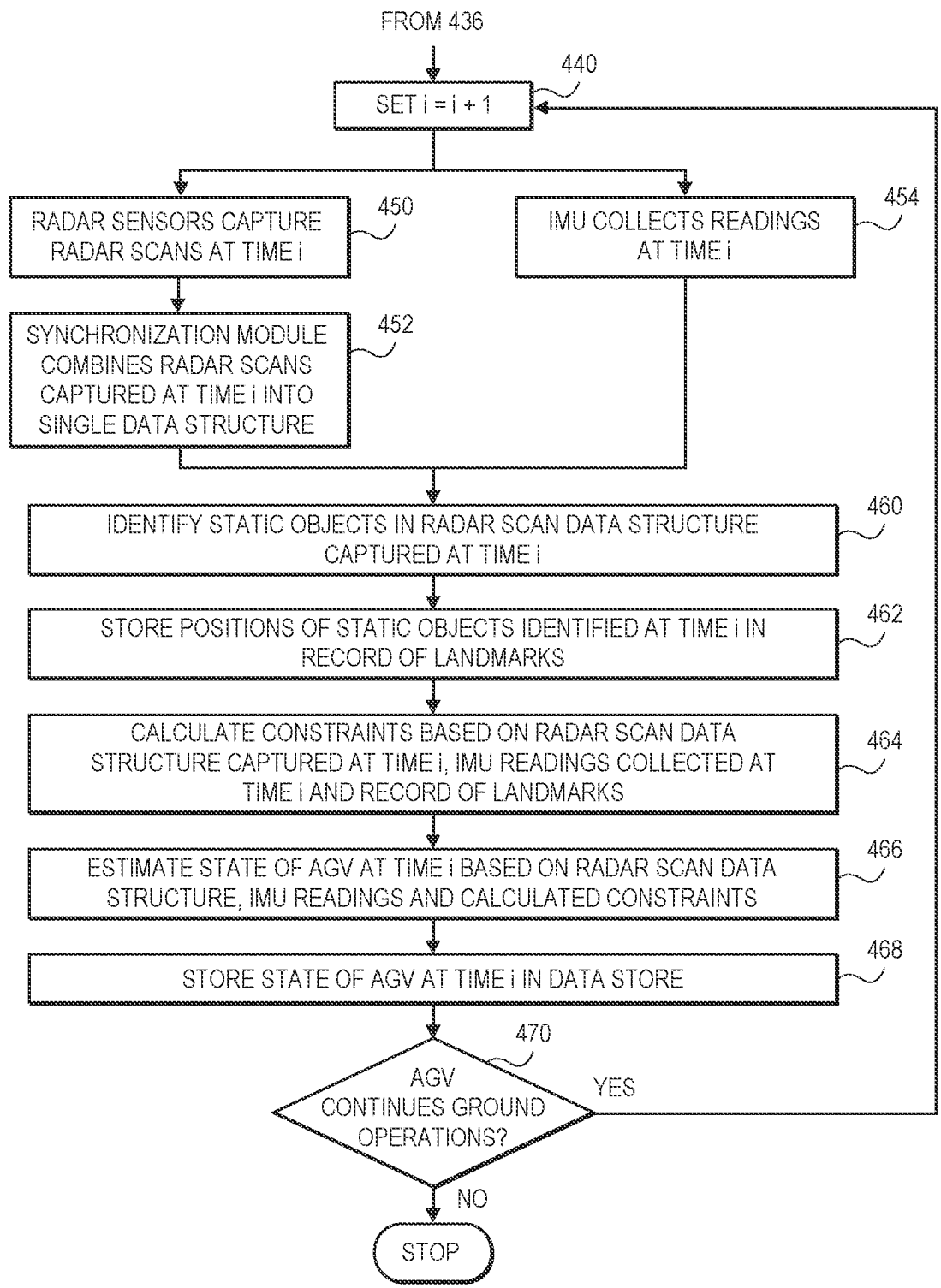

Referring to FIGS. 4A and 4B, a flow chart 400 of one process for radar-inertial odometry in accordance with implementations of the present disclosure is shown. At box 410, an autonomous ground vehicle (or "AGV") outfitted with multiple radar sensors and an inertial measurement unit (or "IMU") engages in ground operations in an environment. The autonomous ground vehicle may include one or more wheels, axles or other systems for powered movement in one or more directions on ground surfaces formed from materials of any type or form (e.g., asphalt, bituminous pavement, bricks, cement, cobblestone, composite materials, concrete, dirt, grass, gravel, pavers, or any other materials).

The radar sensors of the autonomous ground vehicle may be of any type or form. In some implementations, the radar sensors may be millimeter wave radar sensors, or radar sensors that transmit radar signals with wavelengths on the order of millimeters, e.g., at frequencies of approximately thirty to three hundred gigahertz (30-300 GHz), or wavelengths of one to ten millimeters (1-10 mm). For example, in some implementations, a radar sensor may emit signals at frequencies of approximately seventy-six to eighty-one gigahertz (76-81 GHz), and with wavelengths of approximately four millimeters. The radar sensors may include one or more components for transmitting and receiving radar signals, as well as any number of clocks, converters, controllers, processors, or other systems for transmitting signals, receiving signals, or interpreting the received signals.

The autonomous ground vehicle may include any number of radar sensors, which may be oriented at any angle with respect to the principal axes of the autonomous ground vehicle, e.g., a normal axis (or yaw axis), a lateral axis (or pitch axis), or a longitudinal axis (or roll axis). For example, in some implementations, the autonomous ground vehicle may include a first radar sensor oriented to transmit radar signals forward of the autonomous ground vehicle, and to capture and interpret reflections of such signals. The autonomous ground vehicle may further include a second radar sensor oriented to transmit radar signals from a left side (or a port side) of the autonomous ground vehicle, and to capture and interpret reflections of such signals, or a third radar sensor oriented to transmit radar signals from a right side (or a starboard side) of the autonomous ground vehicle, and to capture and interpret reflections of such signals. Alternatively, the autonomous ground vehicle may include any number of sensors other than three, and such sensors may be oriented in any direction with respect to a frame of the autonomous ground vehicle other than forward, left or right of the autonomous ground vehicle.

The inertial measurement unit may be configured to detect changes in linear or rotational motion of the autonomous ground vehicle, such as any linear or angular motion or changes in such motion along one or more principal axes of the autonomous ground vehicle, e.g., a normal axis (or yaw axis), a lateral axis (or pitch axis), or a longitudinal axis (or roll axis) of the autonomous ground vehicle. The inertial measurement unit may include one or more gyroscopes, accelerometers, magnetometers, or any other components. In some implementations, an autonomous ground vehicle may include two or more inertial measurement units.

The ground operations may be any operations requiring travel from one location to another by the autonomous ground vehicle and may include, but need not be limited to, a delivery of an item from one location to another location.

At box 415, a value of a step variable i is set equal to one, or i=1. At box 420, the radar sensors of the autonomous ground vehicle capture radar scans at a time i. For example, in some implementations, the radar sensors may transmit waves of electromagnetic energy at any frequency, and capture returns of the electromagnetic energy reflected from surfaces of objects. The radar scans may identify bearings to any returns, ranges to such returns, or any other information or data regarding such returns. Additionally, information or data regarding the radar scans may be stamped with an indication or an identifier of the time i, e.g., a timestamp of the time i.

At box 422, a synchronization module combines radar scans that were captured at time i into a single data structure. For example, in some implementations, an operating system or processor unit operating on the autonomous ground vehicle may provide radar scans to a module that identifies radar scans captured at a common time and publishes such scans as a synchronized set or data structure of radar scans that were captured at the time i.

In parallel, at box 424, the inertial measurement unit collects readings at the time i. Such readings may include, but need not be limited to, accelerations, angular velocities and/or magnetic field measurements, or other readings, representing motion of the autonomous ground vehicle at the time i.

At box 430, one or more constraints are calculated based on the radar scan data structure captured at time i and the IMU readings collected at time i. The constraints (or factors) may include, but need not be limited to, a doppler constraint (or factor) that may constrain an estimated velocity of the autonomous ground vehicle. In some implementations, a doppler constraint may be calculated based at least in part on an error function for each of the radar detections determined in a set of scans, based on rotations between the radar sensors and the inertial measurement unit, translations between the radar sensors and the inertial measurement unit, locations of each of the radar detections and doppler measurements for each of the radar detections.

The constraints (or factors) may also include an inertial measurement unit constraint (or factor), which may constrain estimates of velocities and orientations of the autonomous ground vehicle between adjacent states, including but not limited to pitch angles and roll angles.

At box 432, a state of the autonomous ground vehicle at time i is estimated based on the radar scan data structure, the inertial measurement unit readings, and the constraints calculated at box 430. The state may be determined according to a non-linear optimization or in any other manner, and represent an estimate of the position, the orientation and the motion of the autonomous ground vehicle in the real world, e.g., positions, orientations, linear and rotational velocities and/or accelerations.

In some implementations, an odometry message or another set of data indicating a state of the autonomous ground vehicle at the time i may be generated and stored or transmitted to one or more devices, systems or components, or otherwise utilized in any manner.

At box 434, the state of the autonomous ground vehicle at time i is stored in a data store. The state of the autonomous ground vehicle may be represented in terms of positions, linear or angular velocities, linear or angular accelerations, and orientations, or in any other manner.

At box 440, a value of the step variable i is incremented by one, or set equal to i+1. At box 450, the radar sensors of the autonomous ground vehicle capture radar scans at a time i. For example, the radar scans may identify bearings to any returns of electromagnetic energy transmitted by such radar sensors, as well as ranges to such returns, or any other information or data regarding such returns. Additionally, information or data regarding the radar scans may be stamped with an indication or an identifier of the time i, e.g., a timestamp of the time i.

At box 452, a synchronization module combines radar scans that were captured at time i into a single data structure. As is discussed above, the radar scans may be provided to a module that identifies radar scans captured at a common time and publishes such scans as a synchronized set or data structure of radar scans captured at the time i.

In parallel, at box 454, the inertial measurement unit collects readings at the time i. Such readings may include, but need not be limited to, accelerations, angular velocities and/or magnetic field measurements, or other readings, representing motion of the autonomous ground vehicle at the time i.

At box 460, static objects are identified in the radar scan data structure captured at time i. In some implementations, static objects (e.g., portions of structures, plant life, or other objects that do not move, or infrequently move) may be distinguished from dynamic objects (e.g., pedestrians or other animals, other vehicles, or other objects that tend to move on a regular or irregular basis) based on their respective locations as sensed within adjacent radar scans, or radar scans captured at different times. For example, an outlier rejection model may differentiate between radar scans corresponding to objects that are stationary or otherwise fixed in their position and radar scans corresponding to objects that are not stationary, or not fixed in their position.

In some implementations, a random sample consensus method, or a "RANSAC" method, may be used to identify and exclude outliers from the radar scan data structure captured at time i, or from other, previously captured radar scan data structures based on the radar scan data structure captured at time i. For example, in some implementations, a random sample consensus method may identify radar detections from multiple radar sensors, e.g., within a radar scan data structure captured at time i, that are determined to be stationary or to move infrequently.

At box 462, positions of the static objects identified at time i are stored in a record of landmarks. The positions of such objects may be determined based on a position of the autonomous ground vehicle at the time i, as well as bearings and ranges from the position of the autonomous ground vehicle to such objects.

Where detections within the radar scan data structure represent static objects that are not previously identified or included within the record of landmarks, the record of landmarks may be updated to include such detections, e.g., their positions, which may be determined based on a position of the autonomous ground vehicle at the time i, as well as bearings to or ranges from the autonomous ground vehicle at the time i.

At box 464, one or more constraints are calculated based on the radar scan data structure captured at time i and the IMU readings collected at time i. As is discussed above, the constraints (or factors) may include, but need not be limited to, a doppler constraint (or factor) that may constrain an estimated velocity of the autonomous ground vehicle. In some implementations, a doppler constraint may be calculated based at least in part on an error function for each of the radar detections determined in a set of scans, based on rotations between the radar sensors and the inertial measurement unit, translations between the radar sensors and the inertial measurement unit, locations of each of the radar detections and doppler measurements for each of the radar detections.

As is discussed above, the constraints (or factors) may include an inertial measurement unit constraint (or factor), which may constrain estimates of velocities and orientations of the autonomous ground vehicle between adjacent states, including but not limited to pitch angles and roll angles.

The constraints (or factors) may also include a landmark constraint (or factor), which may constrain estimates of the autonomous ground vehicle's heading based on the presence of the static objects, or landmarks, within radar scans captured at time i. A landmark constraint may be calculated based at least in part on differences between bearings to a location of a landmark detected in one of the radar scans and a location of the landmark previously identified in one or more radar scans.

At box 466, a state of the autonomous ground vehicle at time i is estimated based on the radar scan data structure, the inertial measurement unit readings, and the constraints calculated at box 464. The state may be determined according to a non-linear optimization or in any other manner, and represent an estimate of the position, the orientation and the motion of the autonomous ground vehicle in the real world, e.g., positions, orientations, linear and rotational velocities and/or accelerations.

In some implementations, an odometry message or another set of data indicating a state of the autonomous ground vehicle at the time i may be generated and stored or transmitted to one or more devices, systems or components, or otherwise utilized in any manner.

At box 468, the state of the autonomous ground vehicle at time i is stored in a data store. The state of the autonomous ground vehicle may be represented in terms of positions, linear or angular velocities, linear or angular accelerations, and orientations, or in any other manner.

At box 470, whether the autonomous ground vehicle is to continue ground operations is determined. If the autonomous ground vehicle is to continue ground operations, then the process returns to box 440, where a value of the step variable i is incremented by one, or set equal to i+1, before returning to box 450 and box 454. If the autonomous ground vehicle is not to continue the ground operations, then the process ends.

Although some of the implementations of the present disclosure may include deliveries of items to destinations by one or more autonomous ground vehicles, those of ordinary skill in the pertinent arts will recognize that the systems and methods of the present disclosure are not so limited. Rather, the systems and methods of the present disclosure may be utilized in connection with any type of operations of one or more autonomous ground vehicles, and are not limited to deliveries of items.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow chart shown in FIGS. 4A and 4B, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method comprising:
   receiving, by a plurality of radar sensors provided aboard an autonomous ground vehicle, a first plurality of radar scans, wherein each of the first plurality of radar scans is received in response to transmissions of electromagnetic energy by the plurality of radar sensors at a first time;
   determining, by an inertial measurement unit provided aboard the autonomous ground vehicle, a first set of inertial measurement unit data, wherein the first set of inertial measurement unit data is determined at the first time;
   calculating at least a first constraint based at least in part on the first plurality of radar scans and the first set of inertial measurement unit data;
   determining a first state of the autonomous ground vehicle at the first time based at least in part on the first constraint, the first plurality of radar scans and the first set of inertial measurement unit data;
   receiving, by the plurality of radar sensors, a second plurality of radar scans, wherein each of the second plurality of radar scans is received in response to transmissions of electromagnetic energy by the plurality of radar sensors at a second time;
   determining, by the inertial measurement unit, a second set of inertial measurement unit data, wherein the second set of inertial measurement unit data is determined at the second time;
   determining, by at least one processor unit provided aboard the autonomous ground vehicle, a position of a first object based at least in part on the second plurality of radar scans;

calculating at least a second constraint based at least in part on the second plurality of radar scans and the second set of inertial measurement unit data;

determining, by the at least one processor unit, a second state of the autonomous ground vehicle at the second time based at least in part on the second constraint, the second plurality of radar scans and the second set of inertial measurement unit data, wherein the second state of the autonomous ground vehicle comprises at least:
- a position of the autonomous ground vehicle at the second time;
- an angle of orientation of the autonomous ground vehicle with respect to at least a first principal axis of the autonomous ground vehicle at the second time;
- a linear velocity of the autonomous ground vehicle at the second time with respect to at least the first principal axis; and
- an angular velocity of the autonomous ground vehicle at the second time with respect to at least the first principal axis; and at least one of:
- storing information regarding the second state of the autonomous ground vehicle at the second time in at least one memory component of the autonomous ground vehicle; or
- transmitting at least a portion of the information regarding the second state of the autonomous ground vehicle to at least one computer system over one or more networks.

2. The method of claim 1, wherein the plurality of radar sensors comprises:
- a first radar sensor configured to transmit first electromagnetic energy in a first direction and to receive radar scans representing reflections of at least some of the first electromagnetic energy;
- a second radar sensor configured to transmit first electromagnetic energy from a second direction and to receive radar scans representing reflections of at least some of the second electromagnetic energy; and
- a third radar sensor configured to transmit third electromagnetic energy from a third direction and to receive radar scans representing reflections of at least some of the third electromagnetic energy.

3. The method of claim 1, wherein each of the plurality of radar sensors is a millimeter wave radar sensor.

4. The method of claim 1, wherein each of the plurality of radar sensors is configured to transmit electromagnetic energy at a frequency within a range of thirty to three hundred gigahertz or at a wavelength within a range of one to ten millimeters.

5. The method of claim 1, wherein at least one of the at least one-first constraint or the second constraint comprises a constraint on a velocity of the autonomous ground vehicle calculated according to an error function for each of the first plurality of radar scans based at least in part on:
- rotations between the plurality of radar sensors and the inertial measurement unit;
- translations between the plurality of radar sensors and the inertial measurement unit;
- locations of each of a plurality of detections; and
- doppler measurements for each of the plurality of detections.

6. The method of claim 1, wherein at least one of the at least one-first constraint or the second constraint comprises a constraint on at least one of:
- a difference between a velocity of the autonomous ground vehicle at the first time and a velocity of the autonomous ground vehicle at a third time, wherein the third time precedes the first time, or
- a difference between an acceleration of the autonomous ground vehicle at the first time and an acceleration of the autonomous ground vehicle at the third time.

7. The method of claim 1, wherein the at least one-first constraint or the second constraint comprises a constraint on a heading of the autonomous ground vehicle calculated based at least in part on a bearing to the first object at the first time and a bearing to the first object at a third time, wherein the third time precedes the first time.

8. The method of claim 1, wherein the autonomous ground vehicle is configured for a delivery of an item from a first location to a second location.

9. The method of claim 1, wherein the autonomous ground vehicle further comprises:
- a frame;
- at least one wheel;
- a motor disposed in association with the frame, wherein the motor is configured to cause the at least one wheel to rotate at a speed within a predetermined speed range; and
- at least one power module for powering the motor.

10. A method comprising:
- determining, by an inertial measurement unit provided aboard the autonomous ground vehicle, a first set of inertial measurement unit data, wherein the first set of inertial measurement unit data is determined at a first time;
- receiving, by a first radar sensor, a first plurality of radar scans in response to transmissions of first electromagnetic energy by the first radar sensor in a first direction at approximately the first time;
- receiving, by a second radar sensor, a second plurality of radar scans in response to transmissions of second electromagnetic energy by the second radar sensor in a second direction at approximately the first time;
- receiving, by a third radar sensor, a third plurality of radar scans in response to transmissions of third electromagnetic energy by the third radar sensor in a third direction at approximately the first time;
- generating a first data structure comprising the first plurality of radar scans, the second plurality of radar scans and the third plurality of radar scans;
- calculating at least a first constraint based at least in part on the first data structure and the first set of inertial measurement unit data;
- determining a first state of the autonomous ground vehicle at the first time based at least in part on the first constraint, the first data structure and the first set of inertial measurement unit data;
- determining, by the inertial measurement unit, a second set of inertial measurement unit data, wherein the second set of inertial measurement unit data is determined at a second time;
- receiving, by the first radar sensor, a fourth plurality of radar scans in response to transmissions of fourth electromagnetic energy by the first radar sensor in the first direction at approximately the second time;
- receiving, by the second radar sensor, a fifth plurality of radar scans in response to transmissions of fifth electromagnetic energy by the second radar sensor in the second direction at approximately the second time;
- receiving, by the third radar sensor, a sixth plurality of radar scans in response to transmissions of sixth electromagnetic energy by the third radar sensor in the third direction at approximately the first time;

determining, by at least one processor unit provided aboard the autonomous ground vehicle, a position of a first object based at least in part on the second plurality of radar scans;

calculating at least a second constraint based at least in part on the second plurality of radar scans and the second set of inertial measurement unit data; and determining, by the at least one processor unit, a second state of the autonomous ground vehicle at the second time based at least in part on the second constraint, the second plurality of radar scans and the second set of inertial measurement unit data.

11. The method of claim 10, wherein the autonomous ground vehicle is configured for a delivery of an item from a first location to a second location, and wherein the autonomous ground vehicle further comprises:
a frame;
at least one wheel;
a motor disposed in association with the frame, wherein the motor is configured to cause the at least one wheel to rotate at a speed within a predetermined speed range; and at least one power module for powering the motor.

12. A method comprising:

receiving, by a plurality of radar sensors provided aboard an autonomous ground vehicle, a first plurality of radar scans, wherein each of the first plurality of radar scans is received in response to transmissions of electromagnetic energy by the plurality of radar sensors at a first time;

determining, by an inertial measurement unit provided aboard the autonomous ground vehicle, a first set of inertial measurement unit data, wherein the first set of inertial measurement unit data is determined at the first time;

calculating at least a first constraint based at least in part on the first plurality of radar scans and the first set of inertial measurement unit data;

determining a first state of the autonomous ground vehicle at the first time based at least in part on the first constraint, the first plurality of radar scans and the first set of inertial measurement unit data;

determining, by at least one processor unit provided aboard the autonomous ground vehicle, that at least a first radar scan of the first plurality of radar scans corresponds to the first object and that at least a second radar scan of the first plurality of radar scans corresponds to a second object;

determining, by the at least one processor unit, that the first object is stationary according to a random sample consensus method based at least in part on the first radar scan and the second radar scan;

determining, by the at least one processor unit, that the second object is in motion according to the random sample consensus method based at least in part on the first radar scan and the second radar scan;

receiving, by the plurality of radar sensors, a second plurality of radar scans, wherein each of the second plurality of radar scans is received in response to transmissions of electromagnetic energy by the plurality of radar sensors at a second time;

determining, by the inertial measurement unit, a second set of inertial measurement unit data, wherein the second set of inertial measurement unit data is determined at the second time;

determining, by the at least one processor unit, a position of a first object based at least in part on the second plurality of radar scans;

calculating at least a second constraint based at least in part on the second plurality of radar scans and the second set of inertial measurement unit data; and determining, by the at least one processor unit, a second state of the autonomous ground vehicle at the second time based at least in part on the second constraint, the second plurality of radar scans and the second set of inertial measurement unit data.

13. The method of claim 12, wherein the first set of inertial measurement unit data comprises:
at least one of a first velocity or a first acceleration about a first principal axis of the autonomous ground vehicle at the first time;
at least one of a second velocity or a second acceleration about a second principal axis of the autonomous ground vehicle at the first time; and
at least one of a third velocity or a third acceleration about a third principal axis of the autonomous ground vehicle at the first time.

14. The method of claim 12, wherein the autonomous ground vehicle is configured for a delivery of an item from a first location to a second location, and wherein the autonomous ground vehicle further comprises:
a frame;
at least one wheel;
a motor disposed in association with the frame, wherein the motor is configured to cause the at least one wheel to rotate at a speed within a predetermined speed range; and at least one power module for powering the motor.

15. A method comprising:

receiving, by a plurality of radar sensors provided aboard an autonomous ground vehicle, a first plurality of radar scans, wherein each of the first plurality of radar scans is received in response to transmissions of electromagnetic energy by the plurality of radar sensors at a first time;

capturing, by an inertial measurement unit provided aboard the autonomous ground vehicle, first data regarding at least one of a velocity or an acceleration of the autonomous ground vehicle at the first time;

determining, by at least one processor unit, at least a first constraint on the autonomous vehicle based at least in part on the first plurality of radar scans and the first data;

determining, by the at least one processor unit, a first state of the autonomous ground vehicle at the first time based at least in part on the first data, the first constraint and the first plurality of radar scans;

receiving, by the plurality of radar sensors, a second plurality of radar scans, wherein each of the second plurality of radar scans is received in response to transmissions of electromagnetic energy by the plurality of radar sensors at a second time, and wherein at least a first radar scan of the second plurality of radar scans comprises a detection of a first object;

capturing, by the inertial measurement unit, second data regarding at least one of a velocity or an acceleration of the autonomous ground vehicle at the second time;

determining, by the at least one processor unit, at least a second constraint on the autonomous vehicle based at least in part on the second plurality of radar scans and the second data;
determining, based at least in part on the detection of the first object, a position of a first object; and
determining, by the at least one processor unit, a second state of the autonomous ground vehicle at the second time based at least in part on the second data, the second constraint and the position of the first object, wherein the second state of the autonomous ground vehicle at the second time comprises:
  a position of the autonomous ground vehicle at the second time;
  an angle of orientation of the autonomous ground vehicle with respect to at least a first principal axis of the autonomous ground vehicle at the second time;
  a linear velocity of the autonomous ground vehicle at the second time with respect to at least the first principal axis; and
  an angular velocity of the autonomous ground vehicle at the second time with respect to at least the first principal axis.

16. The method of claim 15, wherein receiving the first plurality of radar scans comprises:
  receiving, by a first radar sensor of the plurality of radar sensors, radar scans in response to transmissions of electromagnetic energy by the first radar sensor at approximately the first time;
  receiving, by a second radar sensor of the plurality of radar sensors, radar scans in response to transmissions of electromagnetic energy by the second radar sensor at approximately the first time;
  receiving, by a third radar sensor of the plurality of radar sensors, radar scans in response to transmissions of electromagnetic energy by the third radar sensor at approximately the first time, wherein the first plurality of radar scans consists of the radar scans received by the first radar sensor in response to transmissions of electromagnetic energy by the first radar sensor at approximately the first time, the radar scans received by the second radar sensor in response to transmissions of electromagnetic energy by the second radar sensor at approximately the first time, and the radar scans received by the third radar sensor in response to transmissions of electromagnetic energy by the third radar sensor at approximately the first time; and
  generating a data structure comprising the first plurality of radar scans,
  wherein the second constraint is calculated based at least in part on the data structure.

17. The method of claim 15, wherein a second radar scan of the second plurality of radar scans comprises a detection of a second object, and
  wherein the method further comprises:
  determining, by the at least one processor unit, that at least the first radar scan corresponds to the first object and that at least the second radar scan corresponds to the second object;
  determining, by the at least one processor unit, that the first object is stationary according to a random sample consensus method based at least in part on the first radar scan; and
  determining, by the at least one processor unit, that the second object is in motion according to the random sample consensus method based at least in part on the second radar scan,
  wherein the second state of the autonomous ground vehicle at the second time is not determined based on the second radar scan.

18. The method of claim 15, wherein the autonomous ground vehicle is configured for a delivery of an item from a first location to a second location, and
  wherein the autonomous ground vehicle further comprises:
  a frame;
  at least one wheel;
  a motor disposed in association with the frame, wherein the motor is configured to cause the at least one wheel to rotate at a speed within a predetermined speed range; and
  at least one power module for powering the motor.

19. A method comprising:
  receiving, by a plurality of radar sensors provided aboard an autonomous ground vehicle, a first plurality of radar scans, wherein each of the first plurality of radar scans is received in response to transmissions of electromagnetic energy by the plurality of radar sensors at a first time;
  determining, by an inertial measurement unit provided aboard the autonomous ground vehicle, a first set of inertial measurement unit data, wherein the first set of inertial measurement unit data is determined at the first time;
  calculating at least a first constraint based at least in part on the first plurality of radar scans and the first set of inertial measurement unit data,
  determining a first state of the autonomous ground vehicle at the first time based at least in part on the first constraint, the first plurality of radar scans and the first set of inertial measurement unit data;
  receiving, by the plurality of radar sensors, a second plurality of radar scans, wherein each of the second plurality of radar scans is received in response to transmissions of electromagnetic energy by the plurality of radar sensors at a second time;
  determining, by the inertial measurement unit, a second set of inertial measurement unit data, wherein the second set of inertial measurement unit data is determined at the second time;
  determining, by at least one processor unit provided aboard the autonomous ground vehicle, a position of a first object based at least in part on the second plurality of radar scans;
  calculating at least a second constraint based at least in part on the second plurality of radar scans and the second set of inertial measurement unit data, wherein the second constraint comprises one of:
    a constraint on a velocity of the autonomous ground vehicle calculated according to an error function for each of the first plurality of radar scans based at least in part on rotations between the plurality of radar sensors and the inertial measurement unit, translations between the plurality of radar sensors and the inertial measurement unit, locations of each of a plurality of detections, and doppler measurements for each of the plurality of detections;
    a constraint on a difference between a velocity of the autonomous ground vehicle at the first time and a velocity of the autonomous ground vehicle at a third time, wherein the third time precedes the first time;

a constraint on a difference between an acceleration of the autonomous ground vehicle at the first time and an acceleration of the autonomous ground vehicle at the third time; or a constraint on a heading of the autonomous ground vehicle calculated based at least in part on a bearing to the first object at the first time and a bearing to the first object at the third time; and determining, by the at least one processor unit, a second state of the autonomous ground vehicle at the third time based at least in part on the second constraint, the second plurality of radar scans and the second set of inertial measurement unit data.

20. The method of claim 19, wherein the autonomous ground vehicle is configured for a delivery of an item from a first location to a second location, and wherein the autonomous ground vehicle further comprises:

a frame;

at least one wheel;

a motor disposed in association with the frame, wherein the motor is configured to cause the at least one wheel to rotate at a speed within a predetermined speed range; and at least one power module for powering the motor.

* * * * *